United States Patent [19]
Imura et al.

[11] Patent Number: 5,999,747
[45] Date of Patent: *Dec. 7, 1999

[54] CAMERA WITH DEVICE TO PREVENT IMAGE BLURS

[75] Inventors: Yoshio Imura, Kawasaki; Hidenori Miyamoto, Urayasu; Isao Soshi, Shibuya-ku; Minoru Kato; Junichi Omi, both of Kawasaki, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,455

[22] Filed: Mar. 3, 1997

Related U.S. Application Data

[63] Continuation of application No. 08/301,895, Sep. 7, 1994, abandoned, which is a continuation-in-part of application No. 08/154,777, Nov. 19, 1993, abandoned.

[30] Foreign Application Priority Data

Nov. 19, 1992 [JP] Japan ..................................... 4-332252
Sep. 7, 1993 [JP] Japan ..................................... 5-246375

[51] Int. Cl.⁶ ............................ G03B 15/03; G03B 17/00
[52] U.S. Cl. ................................................ 396/55; 396/61
[58] Field of Search .................................. 396/61, 52–55, 396/72, 204

[56] References Cited

U.S. PATENT DOCUMENTS

| | | | |
|---|---|---|---|
| 3,953,864 | 4/1976 | Iwata et al. ............................... | 354/419 |
| 4,500,191 | 2/1985 | Yamanaka ............................. | 354/419 X |
| 4,878,081 | 10/1989 | Kishida et al. ...................... | 354/419 X |
| 4,941,009 | 7/1990 | Yoshida ............................... | 354/421 X |
| 5,017,955 | 5/1991 | Kotani .................................. | 354/419 X |
| 5,038,165 | 8/1991 | Amanuma et al. .................. | 354/419 X |
| 5,084,724 | 1/1992 | Maeno .................................... | 354/430 |
| 5,117,246 | 5/1992 | Takahashi et al. .................. | 354/430 X |
| 5,198,855 | 3/1993 | Iwai ..................................... | 354/419 X |
| 5,266,981 | 11/1993 | Hamada et al. .......................... | 396/55 |
| 5,415,558 | 5/1995 | Katayama et al. .................. | 354/430 X |
| 5,416,554 | 5/1995 | Hamada et al. ..................... | 354/430 X |
| 5,463,443 | 10/1995 | Tanaka et al. ........................... | 354/430 |

OTHER PUBLICATIONS

U.S. Application No.08/603,875, filed Feb. 22, 1996, Yoshio Imura et al., Nikon Corporation.

*Primary Examiner*—W. B. Perkey
*Attorney, Agent, or Firm*—Staas & Halsey, LLP

[57] ABSTRACT

An image deflection preventing device for a camera, such as a still camera which is used to drive a deflection preventing optical system in accordance with readings from angular velocity sensors and other circuitry. Moreover, an exposure mode selection device is included to select strobe photography according to the focusing distance from a distance measuring unit maintained in the camera to a subject to be photographed. The selection device can select strobe photography when the focusing distance is closer than a predetermined distance or when photographic magnification from a focal length detection unit to a subject to be photographed is greater than a predetermined value. The selection of strobe photography is done using results from a photometric unit in conjunction with the determination of a brightness level. In particular, if a given brightness level is equal to or greater than a predetermined value, strobe photography is selected, otherwise, exterior light photography is selected. The brightness level for selection of strobe photography is typically higher at closer distances, longer focal lengths, or larger photographic magnifications.

11 Claims, 15 Drawing Sheets

40x : ENCODER "X" AXIS
41x : ENCODER "Y" AXIS

CAMERA WITH DEVICE TO PREVENT IMAGE BLURS

This application is a continuation of application Ser. No. 08/301,895, filed Sep. 7, 1994, now abandoned, which is a Continuation-In-Part of U.S. Ser. No. 08/154,777 filed on Nov. 19, 1993 (now abandoned).

BACKGROUND OF THE INVENTION

1. Field of the Invention

The present invention relates to image deflection preventing devices used with cameras for preventing image deflection caused by camera movement resulting from such things as hand tremor and the like.

2. Description of the Related Art

In recent years, cameras have realized a marked increase in the use of electronics, including, but not limited to, the use of automatic exposure mechanisms and autofocus mechanisms. However, these technologies have been insufficient countermeasures against image deflection due to hand tremors and the like.

Because current technologies have been insufficient to deal with image deflection, various proposals have been made to prevent image deflection which arises from vibration of the camera and in particular from inclination of the camera. Such proposals have sought to correct for image deflection by detecting the vibration of the camera by means of angular velocity sensors. Moreover, these proposals have sought to prevent deflection by responding to the results of the angular velocity sensors by driving and shifting either the photographic lens system or the optical system of a portion of the photographic lens system. In cameras equipped with the aforementioned kind of image deflection preventing devices, the photographic lens system, or the optical system of a portion of the lens system is movably supported in a deflection preventing optical system and is moved in a plane which is orthogonal relative to the optical axis of the principal optical system and in a direction so as to absorb the deflection. In this manner, image deflection is minimized, but not eliminated. For a further description of devices of the type described above, reference is made to U.S. Pat. No. 5,084,724 to Maeno.

In spite of the aforementioned proposals to correct for image deflection, the above-mentioned systems maintain difficulties in accurately detecting the movement of a camera device. Moreover, angular velocity sensors, alone, do not account for the total correction of image deflection due to the many circumstances of camera vibration. In particular, a camera undergoes many complex motions during hand-held photography which can be classified as follows:

(1) Camera tilt motions (i.e., TILT of the optical axis of a camera's photographic lens); and (2) Camera shift motions which are approximately at right angles to the optical axis of the photographic lens system (i.e., SHIFT of the optical axis of a camera's photographic lens).

As such, the vibrational effects of a camera device arise by the composition of the individual vibrational components due to the motions defined according to items (1) and (2) above. While the aforementioned image deflection preventing systems can detect camera vibration due to motion defined according to item (1), such image deflection preventing systems cannot detect camera device vibration due to motion defined according to item (2) above. Accordingly, the aforementioned image deflection preventing systems only allow for the prevention of deflection which occurs as a result of camera device motion defined by item (1) but not by motion defined by item (2).

To better understand the effects of the camera device vibrations defined in items (1) and (2) above, reference is now made to FIG. 18 which depicts a deflection situation. FIG. 18 shows a lens L which has been aligned along a center point of imaging plane B and which has realized a movement of its optical axis I to I' through an angle Θ. This kind of tilt of the optical axis I to I' results in a deflection of an image in accordance with the motion defined by item (1) above.

FIG. 19 illustrates the deflection realized due to the movement of the lens L's optical axis. When viewing the inclination of the optical axis I, with the principal point H of the lens L as center, the optical axis I similarly becomes tilted by an angle Θ to I". In order to fully analyze the effects of the deflection depicted in FIGS. 18 and 19 as a result of the motion defined in item (1) above, reference is now made to the following equations wherein the following variables bear the following meanings:

a=The distance from the center point H of lens L to the photographic subject A;

b=The distance from the center point H of lens L to the imaging plane B;

f=The focal length of the lens L;

δ1=The displacement of an image on the imaging plane B.

δ1 is calculated according to the relationships among the following imaging equations:

$$\frac{1}{a} + \frac{1}{b} = \frac{1}{f} \quad (1)$$

and $$\tan\theta = \frac{\delta 1}{b} \quad (2)$$

and $$\delta 1 = \frac{af}{a-f}\tan\theta \quad (3)$$

δ1 will be realized in the direction of the arrow c in FIG. 19.

In assessing the deflection due to a shift of the principal point H of the lens L based on a motion defined by item (2) above, reference is now made to FIG. 20. By a tilt of the optical axis from I to I', the principal point H moves by γ in the direction of the arrow d in FIG. 20. The deflection in the imaging plane is identified as δ2, and due to the photographic magnification m the following relationship emerges in view of equation 1 from above:

$$m = \frac{f}{a-f} \quad (4)$$

Interestingly,

δ2=mγ

$$\delta 2 = m\gamma = \frac{f}{a-f}\gamma. \tag{5}$$

Finally, δ2 will be realized in the direction of the arrow c as depicted in FIG. 20.

With the foregoing formulae and relationships in mind, it should be understood that when the tilt of the optical axis from I to I' occurs as shown in FIG. 18, total deflection δ can be stated as:

δ=δ1+δ2

$$\delta = \delta 1 + \delta 2 = \frac{f}{a-f}(\gamma + a\cdot\tan\theta) \tag{6}$$

As noted above, the image deflection in the aforementioned devices is performed by angular velocity sensors. As such, the deflection δ1 due to the tilt of the optical axis from I to I' can be detected, but the deflection δ2 due to the shift of the principal point H of the lens L cannot be detected. Such a lack of detection of the motion defined by item (2) above is due to the fact that the movement γ of the principal point H, which is not limited to the tilt of the camera normally around the image point B as the center, cannot be detected. In turn, the aforementioned image deflection detecting devices provide for the correction and adjustment of an optical system during motion defined by item (1) above.

Accordingly, it is desired to adopt some countermeasures capable of obtaining a deflection preventing function for the deflection δ2 which arises due to a shift of the principal point H of the above-mentioned lens L.

SUMMARY OF THE INVENTION

It is therefore an object of the present invention to provide an image deflection prevention device for use with a camera that, when the camera is moved by hand tremors and the like, it becomes possible to prevent image deflection during times of shifting of the optical axis of the camera's photographic lens and/or during times of tilting of the optical axis of a camera's photographic lens.

It is a further object of the present invention to provide an image deflection prevention device that incorporates the use of strobe photography to prevent deflection as it arises due to hand tremor and the like.

It is a further object of the present invention to provide an image deflection prevention device that incorporates the use of angular velocity sensors and a deflection mechanism to prevent deflection by moving a camera's photographic lens, or a portion of its optical system.

These and other objects and advantages are provided for by the present invention in that an image deflection preventing device for use with a camera detects camera deflections by utilizing angular velocity sensors. The device is also equipped with a deflection preventing unit to prevent deflection by means of driving the photographic lens, or a portion of its optical system in directional placement to adjust for deflection. The device also includes a distance measuring circuitry for measuring the distance to a photographic subject, and an exposure mode selection unit for selecting strobe photography according to the focusing distance. Moreover, the present invention provides an image deflection preventing device which selects strobe photography when the focusing distance to the photographic subject is at a closer distance than a predefined distance.

Moreover, the deflection preventing device of the camera according to the present invention is equipped with a focal length detection unit to detect the focal length of the photographic lens. Also the device is arranged such that the exposure mode selection unit selects strobe photography in situations where the photographic magnification is greater than a predetermined value. Additionally, the device selects strobe photography in structures where the focusing distance is a closer distance than a predefined distance, or in structures where the photographic magnification is greater than a predetermined value.

The present invention also provides an image deflection preventing device for use with a camera which detects deflections by use of angular velocity sensors. Moreover, the device is also equipped with a deflection preventing unit to prevent deflection by means of driving the photographic lens or a portion of its optical system to correct for deflection. A photometer circuit is used to measure the luminosity of a photographic subject. Distance measurement circuitry is also used to measure the distance from the camera to a photographic subject. Also, exposure mode selection circuitry is used to select strobe photography based on the measurement results of this photometer means and distance measurement means.

Furthermore, in the deflection preventing device of the camera according to the present invention, the exposure mode selection unit is arranged to use the brightness level as a standard of whether or not to select strobe photography. Strobe photography is selected in structures where the brightness level is greater than or equal to a predetermined brightness level. Alternatively, selection of external light photography occurs when the brightness level is more luminous than a set brightness level.

Also, the deflection preventing device of the camera according to the present invention is equipped with focal length detection circuitry to detect the focal length of the photographic lens, since the longer the focal length, the higher the brightness level.

BRIEF DESCRIPTION OF THE DRAWINGS

The above-mentioned and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

A detailed description of the preferred embodiments for the deflection preventing device of a camera according to the invention is set forth below with reference to the drawings.

Exemplary embodiments of a deflection preventing device for use with a camera according to the present invention are shown in FIGS. 1–18. A schematic view of a camera having a focal plane shutter and mounted photographic lens to which the present invention is applied is shown in FIGS. 11 and 12 and is described below.

Figure 11:
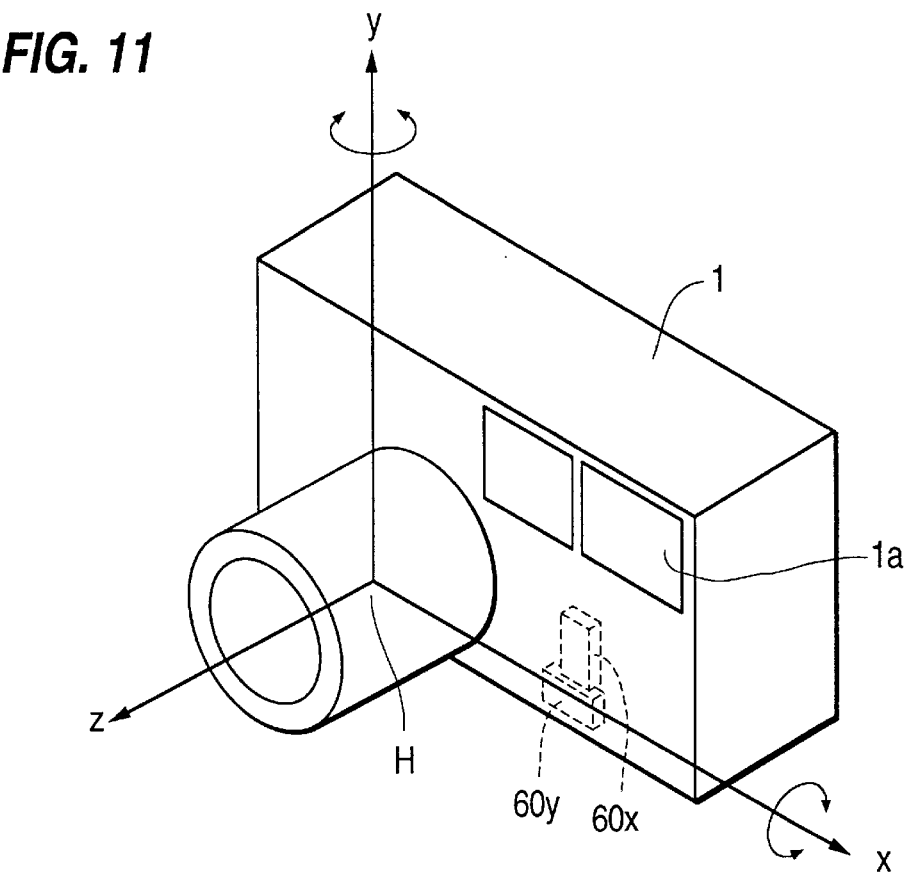
FIG. 11 is a oblique schematic view showing the external appearance of a camera device in which the image deflection preventing device according to a preferred embodiment of the present invention resides.

Referring now to FIG. 11, this schematic view shows the external appearance of a camera denoted by 1. Within the body of the camera 1 are well known angular velocity sensors 60x, 60y. Here, with the principal point H of the photographic lens as the origin, coordinate axes x, y, z are shown in FIG. 11, with the z axis coinciding with the optical axis I, mentioned hereinbelow, of the photographic lens. Furthermore, vibration about the y axis of the camera, namely a deflection in the x axis direction, is detected by the aforementioned angular velocity sensor 60x. Vibration about the x axis of the camera, namely a deflection in the y axis direction, is detected by the aforementioned angular velocity sensor 60y. Moreover, a strobe light emitting unit 1a is provided which will be discussed below.

Figure 12:
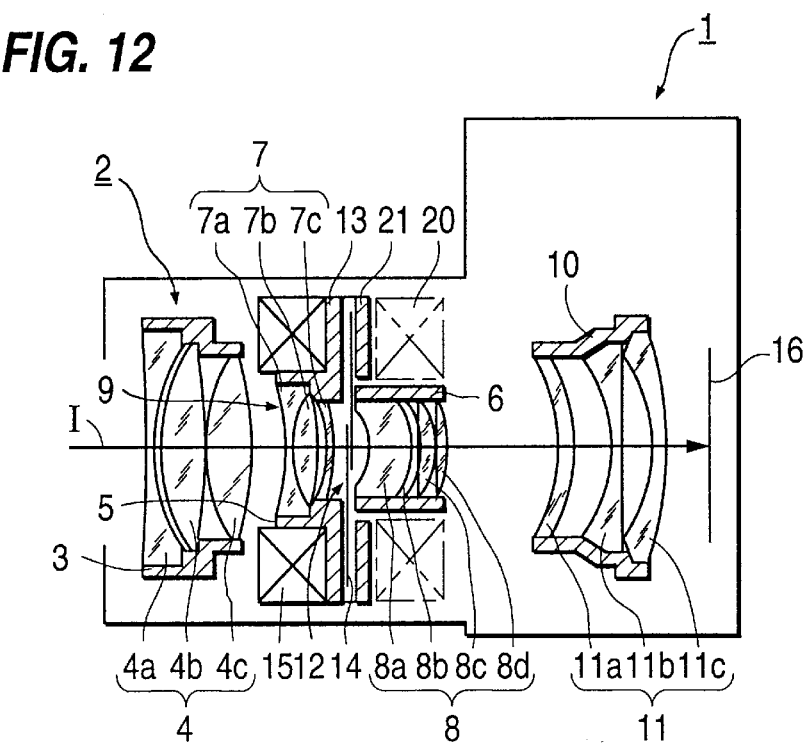
FIG. 12 is a schematic diagram which illustrates a camera having a focal plane shutter to which is applied the image deflection preventing device according to a preferred embodiment of the present invention.

As illustrated in FIG. 12, a photographic lens system 2 of the camera 1 has a first lens group 4 having three lenses 4a, 4b, 4c retained in a lens mount 3. A second lens group 9 comprises a total of 7 lenses having front and rear lens groups 7 and 8 with three lenses 7a, 7b, 7c and four lenses 8a, 8b, 8c, 8d, respectively retained in lens mounts 5 and 6. A third lens group 11 has three lenses 11a, 11b, 11c retained in a lens mount 10.

Reference numeral 12 in FIG. 12 denotes a focal plane shutter interposed between the front and rear lens groups 7 and 8 of the second lens group 9, and is placed near shutter blinds 13 and 14 and a drive unit 15 which drives the shutter blinds. Moreover, drive unit 15 is located in the inner peripheral portion of the lens mount 5 of the front lens group 7 in the aforementioned second lens group 9. The shutter blinds 13 and 14 are located directly in front of the rear lens group 8 which, as mentioned hereinbelow, functions as an image deflection preventing lens.

Reference numeral 16 indicates an imaging surface of a film, the photographic subject image being imaged by the first, second and third lens groups which constitute the photographic lens system 2. Reference indicator "I" indicates the optical axis of the photographic lens system 2. While a film 16 is shown as the imaging surface, other well known surfaces may be incorporated for example. Video cameras may be used which include non-film imaging devices.

In order for the photographic lens system 2 to move, the rear lens group 8 of the second lens group 9 acts as an image deflection preventing lens by shifting at right angles to the optical axis I according to the image deflection state of the image on the aforementioned imaging surface 16. To carry out this movement, an image deflection preventing unit 20 as shown in FIGS. 13–15, is disposed upon baseplate 21 of the focal plane shutter 12 in the outer peripheral side space of the rear lens group 8 in the second lens group 9.

Figure 13:
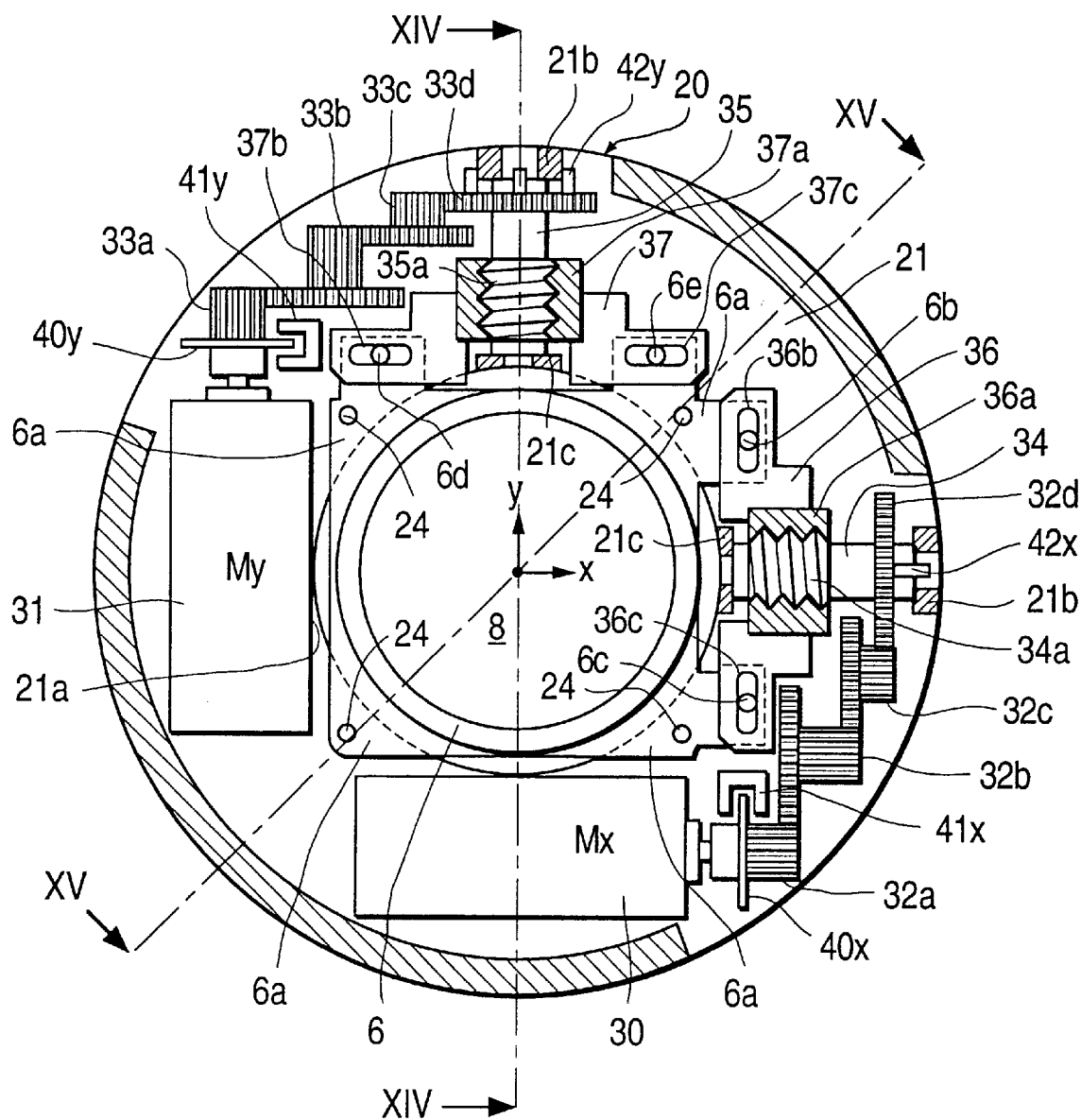
FIG. 13 is a cross sectional view of an image deflection preventing unit in a lens barrel portion of a camera device according to a preferred embodiment of the invention.
Figure 14:
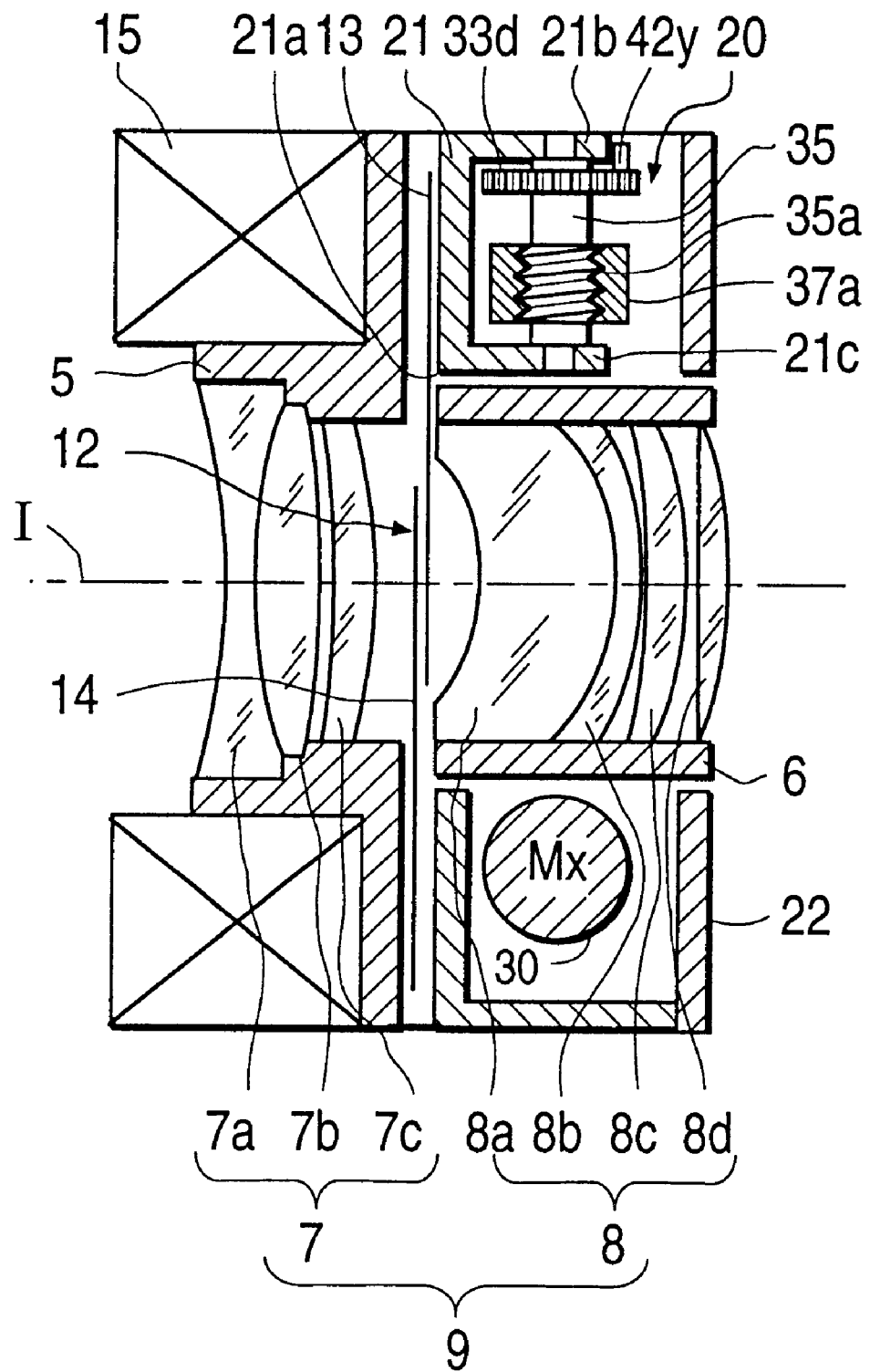
FIG. 14 is a cross sectional view of the unit taken along a line XIV—XIV in FIG. 13.
Figure 15:
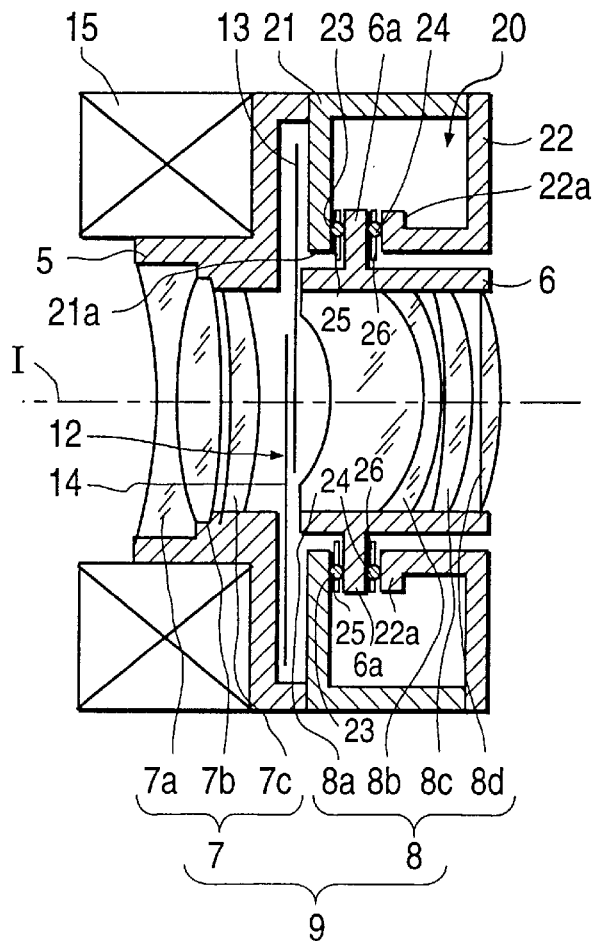
FIG. 15 is a cross sectional view of the unit taken along a line XV—XV in FIG. 13.

Referring now to FIGS. 13–15, the rear lens group 8 in the aforementioned second lens group 9 (described hereinbelow as "deflection preventing lens 8") is in a state retained and fixed in the lens mount 6. Lens mount 6, having a flange 6a arranged on its outer periphery, is movably supported at low load in a direction at right angles to the optical axis I by the interposition, front and rear, at four positions each, of respective balls (hard spheres) 23 and 24 (two places omitted) between baseplate 21 and a cap portion 22a of four places (only two shown in FIG. 15) of a cover 22 forming internally an annular space set up in the rear end side of baseplate 21 at the inner side aperture 21a of the baseplate 21.

Moreover, reference numerals 25 and 26 in FIG. 15 indicate retainers used to support respective balls 24 and 24. Only four positions are shown in the drawing, while four remaining positions have been omitted.

Reference numerals 30 and 31 indicate DC motors (labeled Mx and My in the Figures) and act as drive unit in the x and y axes to move the aforementioned image deflection preventing lens 8 in the x axis direction and y axis direction. Reference numerals 32 and 33 indicate respective gear trains for the transmission of drive force from motors 30 and 31, and comprise gears 32a, 32b, 32c, 32d, 33a, 33b, 33c, and 33d. The rotation of the aforementioned gears is transmitted to first and second shafts 34 and 35 extending in the x axis direction and the y axis direction and rotationally supported in bearings 21b, 21c.

Motors 30 and 31 are fixed on baseplate 21. Furthermore gears 32a, 32b, 32c; and 33a, 33b, 33c forming respective gear trains 32 and 33 are rotatably fixed on baseplate 21. Additionally, the last gears 32d and 33d are rotatably integral with respective shafts 34 and 35.

Reference numerals 36 and 37 indicate x axis side and y axis side coupling members in which are arranged respective female screws 36a and 37a for screw connection to the male screw portions 34a and 35a of the aforementioned shafts 34 and 35. Parallel slotted holes 36b and 36c are formed in the y axis direction and in the x direction coupling member 36, and bolts 6b and 6c disposed in the flange portion 6a of the aforementioned lens mount 6 cooperate with these slotted holes 36b and 36c. Moreover, parallel slotted holes 37b and 37c in a similar manner are formed in the x axis direction and in the y axis direction coupling member 37, and bolts 6d and 6e disposed in the flange portion 6a of the aforementioned lens mount 6 cooperate with these slotted holes 37b and 37c.

Accordingly, the above-mentioned deflection preventing lens 8 is moved in the x axis direction by the x axis side motor 30. Delete hard return via the coupling member 36, and thus is free in the y axis direction. Furthermore, deflection preventing lens 8, by means of a similar mechanism, is moved in the y axis direction by the y axis side motor 31 via the coupling member 37, and thus is free in the x axis direction. The aforementioned structure allows deflection preventing lens 8 to be driven in any direction within the aperture 21a of the baseplate 21.

Figure 16:
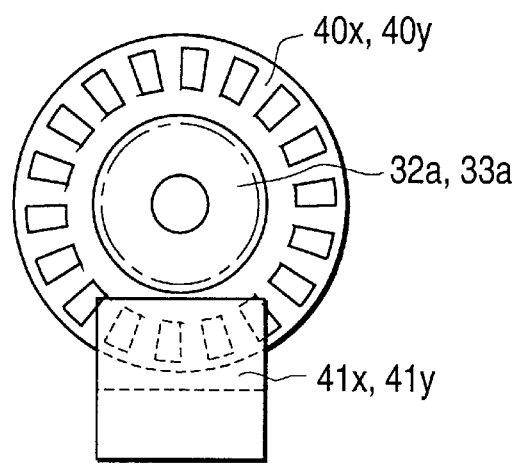
FIG. 16 is a diagram illustrating the position detection means of a deflection preventing lens according to a preferred embodiment of the invention.

The position detection of the above-mentioned deflection preventing lens which is the deflection preventing optical system is carried out by means of perforated disks 40x and 40y with many equal-spaced peripheral holes in their rim portions and which are disposed integrally with the gears 32a and 32b as shown in FIG. 13 and in FIG. 16, with rim portions in an interposed state in respective photointerrupters 41x, 41y disposed on the baseplate 21 side so as to perform detection of the rotation angles of the respective x axis and y axis motors 30 and 31. More particularly, photointerrupters 41x and 41y (i.e., the holes of the disks 41x, 41y) are detected as pulse signals as a means of position detection via counting. Thus, the immediately described structure allows for drive amount detection of the drive amount of the aforementioned deflection preventing lens 8.

Figure 17:
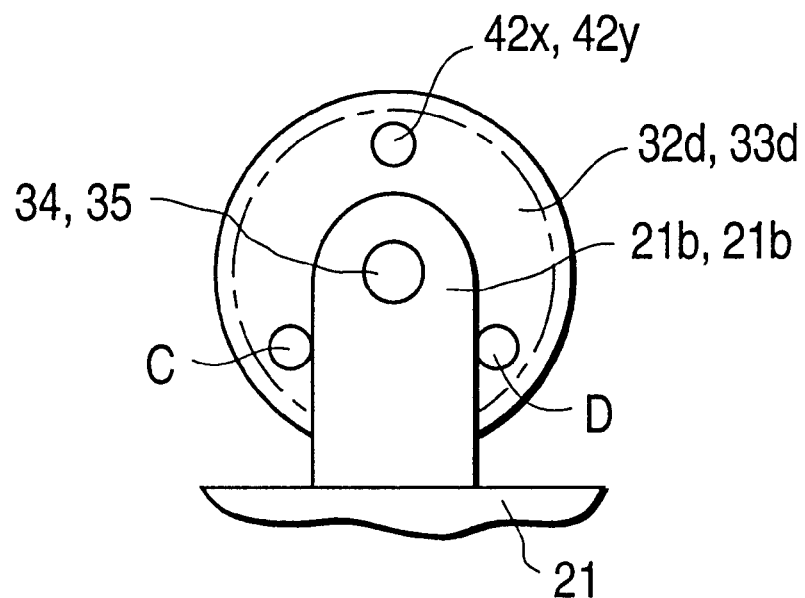
FIG. 17 is a diagram illustrating the method of centering the deflection preventing lens.

In terms of centering, the present deflection preventing lens 8 centers as follows. Referring now to FIGS. 13 and 17, stop pins 42x and 42y are disposed, centrically of the gears 32d and 33d which are integrally disposed on the shafts 34 and 35. Shafts 34 and 35 are such as to be respectively placed in contact at the positions C and D shown in FIG. 17, with both side rims of the bearing portions 21b, 21b on the baseplate 21 side, and by means of these shafts the rotation of the gears 32d and 33d is limited to a range of rotation between the positions C and D.

By way of the agreement of the central position of the deflection preventing lens 8 with the center of the range of rotation of the above-mentioned gears 32d and 33d, the centering is performed of this deflection preventing lens 8 to a central position in conformity with the optical axis I of the principal optical system. By way of such an image deflection preventing unit 20, the rear lens group 8 (deflection preventing lens) of the aforementioned second lens group 9 through movement in a direction at right angles relative to the lens optical axis I, moves the image formed on the imaging surface 16 in the required state, and as a result the deflection of the image is prevented.

Figure 1:
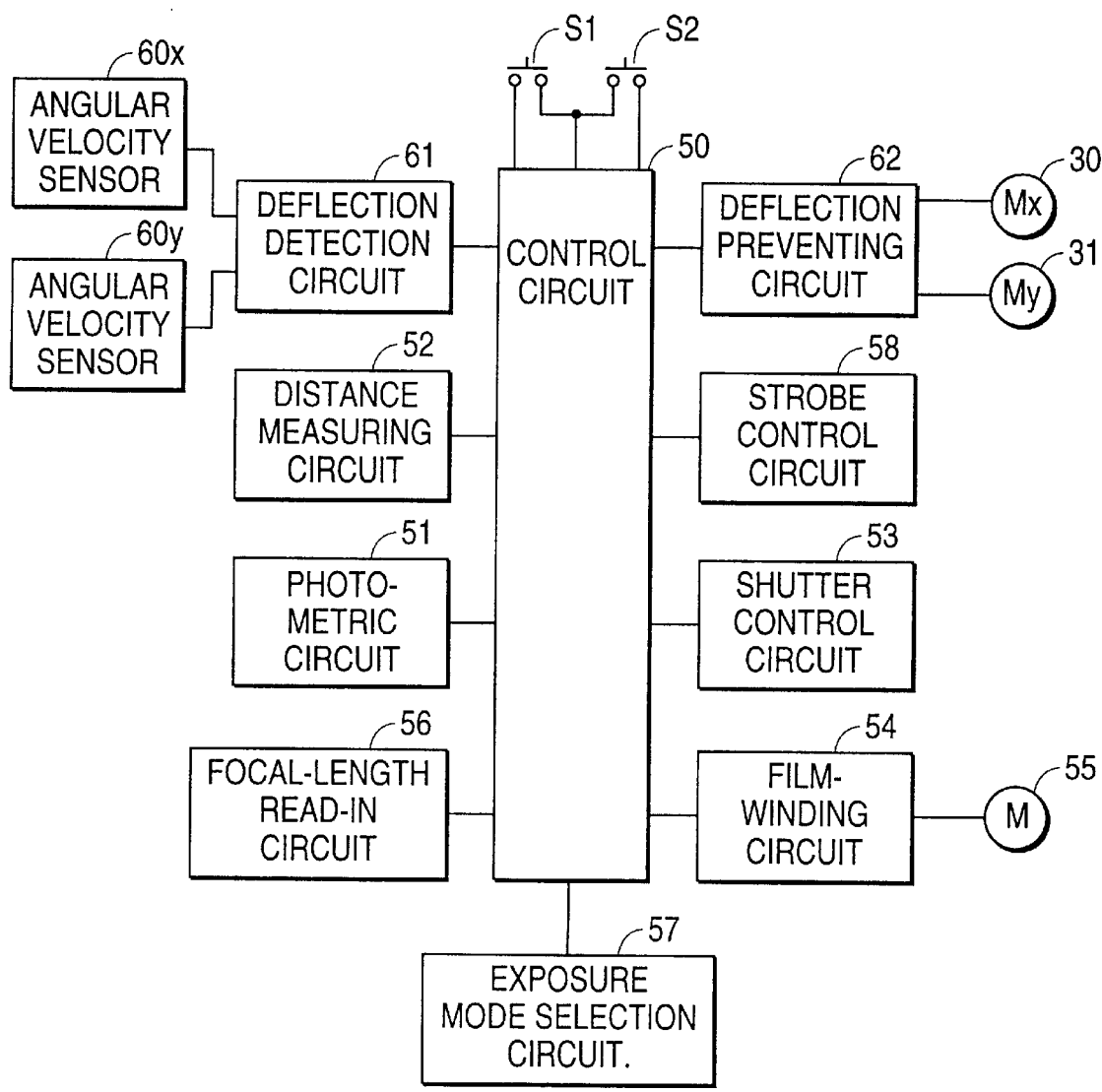
FIG. 1 is a block circuit diagram showing the photographic control circuit of a preferred embodiment of an image deflection preventing device of a camera device according to the present invention.

The image deflection preventing unit 20 described above is controlled by means of the camera photographic circuit contained in the control circuit shown in FIG. 1 so that the necessary image deflection preventing action is performed. The control circuit may include a microcomputer or microprocessor which contains the typical support structures such as, but not limited to, a central processing unit (CPU), a read only memory (ROM), a random access memory (RAM), an arithmetic and logic unit (ALU), etc. The camera photographic control circuit is in the form of a CPU denoted by 50 in FIG. 1, and is arranged to accept input signals from a well known photometer circuit 51 and distance measurement circuit 52.

Moreover, there is provided a shutter control circuit 53, and a film winding circuit 54 to drive in rotation a film winding motor 55 which in turn winds film, and these are controlled by signals from the control circuit 50.

A focal length reading circuit 56 reads in the focal length f of the photographic lens 2. Exposure mode selection circuit 57, as discussed hereinbelow, is used to select strobe photography at appropriate times. As such, a strobe control circuit 58 performs the control of strobe light emission. Preferably, the control circuit 50, by half depression of a release button (not shown in the FIG.) a half depression switch S1 is set ON, and by full depression of the release button a full depression switch S2 is set ON. As such, these circuits are controlled by means of switches S1 and S2.

Angular velocity sensors 60x and 60y in FIG. 1 are well known and are designed to respectively detect the angular velocity of the camera in an up and down or left and right direction. A deflection detection circuit 61 processes the outputs of angular velocity sensors 60x and 60y and converts the processed outputs into image motions on the imaging surface. A deflection preventing circuit 62 receives deflection information from the control circuit 50, by which the signals from the deflection detection circuit 61 have been received to thereby control the drive of the motors 30 and 31, which motors drive the deflection preventing lens 8.

It should be understood that the deflection preventing lens 8, is adopted to provide deflection preventing action in the x axis direction and y axis direction. To control this operation in the required state, strobe photography and exterior light photography may be selected as required, by means of an exposure mode selection circuit.

As such, the deflection preventing circuit 62 together with control circuit 50 control the drive of motors 30 and 31 to prevent image deflection when the angular velocities ωx, ωy of the camera 1are detected by sensors 60x and 60y to be in an up and down direction and/or in a right and a left direction. Moreover, deflection detection circuit 61 will aid in the prevention of deflection by processing the aforementioned values into respective movement velocities of the image on the imaging surface.

As such, the preferred embodiment of the present invention has been described to include a deflection preventing device equipped with an image deflection preventing unit 20, which, in turn, includes a deflection preventing lens 8 which is movably supported in a direction at right angles relative to the optical axis I of a photographic lens system 2. Moreover, a deflection preventing circuit 62 is used to control drives of motors based on the deflection detection results by means of angular velocity sensors 60x and 60y. Motors 30 and 31 are used to effect deflection prevention. A distance measuring circuit 52 is used to measure the distance from the camera to the photographic subject while an exposure mode selection circuit 57 is used to perform strobe selection in accordance with the focusing distance obtained in the distance measuring circuit 52.

The above-mentioned exposure mode selection circuit 57, in the case in which the proportion of the deflection δ2 due to the shift of the principal point H of the lens L relative to the deflection of the camera body 1 is large (see formulae above), preferably is arranged to select strobe photography. For example, strobe photography will be selected regardless if the focusing distance R obtained by means of the distance measuring circuit 52 is a closer distance than a predetermined distance $R_o$, and regardless if the photographic magnification m obtained by means of the focal length detection unit is greater than a prescribed magnification value $m_o$, and regardless if the focusing distance R is a closer distance than the predetermined distance $R_o$, and finally, regardless if the photographic magnification m is larger than the predetermined value $m_o$. Moreover, strobe photography is selected by way of the measurement results of a photometer circuit 51 and the distance measuring circuit 52. In this manner, by only detecting the optical axis I of the photographic lens 2 by the angular velocity sensors 60x and 60y, a detection unit for detecting the shift of the lens principal point H is not necessary, and it becomes possible to effectively prevent the deflection δ.

Figure 18:
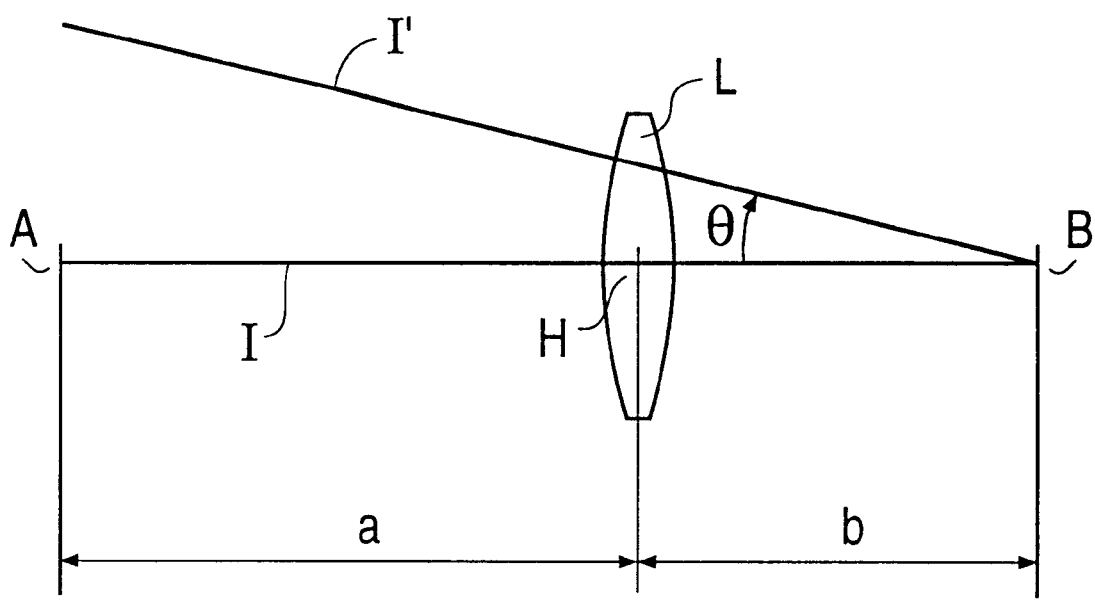
FIG. 18 is a schematic diagram illustrating the deflection state of a camera device.
Figure 19:
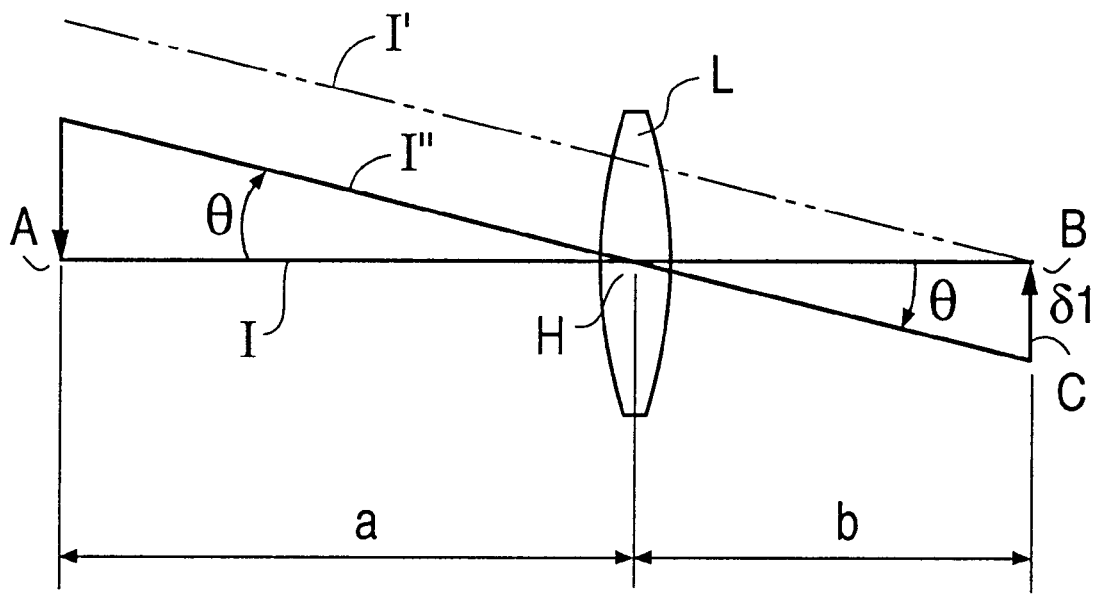
FIG. 19 is a schematic diagram which illustrates deflection when the optical axis of a photographic lens of a camera device is tilted.

As was described with reference to FIGS. 18, 19 and 20, as for the deflection phenomenon of the camera 1, in the case in which tilt in the camera 1 arises and the optical axis I of the photographic lens 2 tilts, and as for the case in which the optical axis I of the lens shifts, the camera 1 moving approximately at right angles to the optical axis I of the photographic lens 2, in the case such that these are detected by the angular velocity sensors 60x and 60y, the deflection δ1 due to the former, as previously mentioned, is comparatively simple to prevent, but the deflection δ2 due to the latter cannot be prevented.

On a different point, to analyze the deflection δ of the body of the camera 1, when the focusing distance R is a close distance, the deflection δ2 due to the latter shift of the optical axis I is more pronounced. In the case in which the proportion of the deflection δ2 which arises due to the shift of the principal point H is large, by means of performing strobe photography, detection systems are not necessary to detect the shift of the principal point, and as a result it is one which can effectively prevent the deflection δ.

To better understand the foregoing discussions related to the prevention of image deflection in regard to the present invention, attention is now directed to understanding how image deflection is actually prevented. First, a case will be considered in which, as shown by FIG. 18, during some time with the image point B as the center, the optical axis I is moved so as to tilt by Θ to I'. The deflection δ1 which arises due to the tilting of the optical axis I is found by equation (3) above, and the deflection δ2 which arises due to the principal point H of the lens L shifting is found from equation (5) above.

Figure 20:
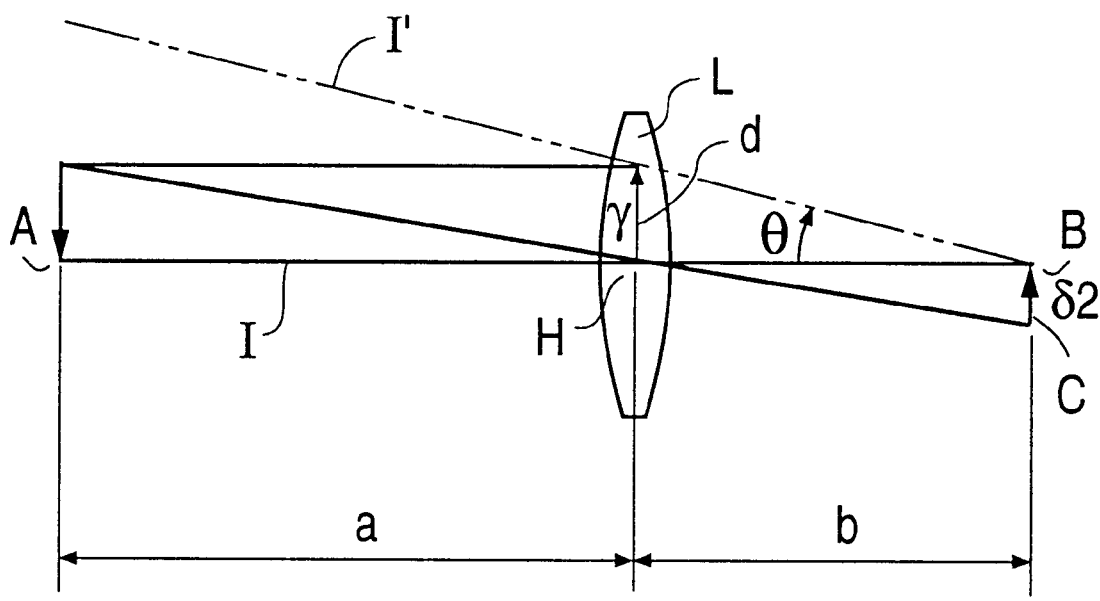
FIG. 20 is a schematic diagram which illustrates deflection when the optical axis of a photographic lens of a camera device is shifted.

Here the movement γ of the principal point H, from FIG. 20, is $$\gamma = b \cdot \tan \Theta, \qquad (7)$$

and the deflection δ2 due to the shift of the principal point H of the lens L is $$\delta 2 = \frac{f}{a-f} b \cdot \tan \theta \qquad (8)$$

Hence, with the tilt Θ of the optical axis I' as Θ=0.25°, the focal length f of the lens L as F=105, 70, 35 mm, and the focusing distance as R=10, 5, 2, 1, 0.6 m, the respective deflection is found and is shown in Table 1.

TABLE 1

(mm)

| | | | | | |
|---|---|---|---|---|---|
| 105 mm δ1 | 0.463 | 0.468 | 0.485 | 0.520 | 0.592 |
| δ2 | $4.97 \times 10^{-3}$ | 0.0103 | 0.0286 | 0.0704 | 0.173 |
| 70 mm δ1 | 0.308 | 0.310 | 0.317 | 0.330 | 0.353 |
| δ2 | $2.18 \times 10^{-3}$ | $4.46 \times 10^{-3}$ | 0.0119 | 0.0271 | 0.0550 |
| 35 mm δ1 | 0.153 | 0.154 | 0.155 | 0.158 | 0.163 |
| δ2 | $5.40 \times 10^{-4}$ | $1.09 \times 10^{-3}$ | $2.82 \times 10^{-3}$ | $5.97 \times 10^{-3}$ | 0.0108 |

Moreover, the proportion of the deflection δ2 due to a shift of the principal point H of the lens L, for a deflection δ of the whole camera body, is shown in Table 2.

TABLE 2

| | | | | | (%) |
|---|---|---|---|---|---|
| f\R | 10 m | 5 m | 2 m | 1 m | 0.6 m |
| 105 mm | 1.06 | 2.15 | 5.57 | 11.92 | 22.61 |
| 70 mm | 0.70 | 1.42 | 3.82 | 7.59 | 13.48 |
| 35 mm | 0.35 | 0.70 | 1.79 | 3.84 | 6.21 |

It will now be readily apparent from Tables 1 and 2, that when the focusing distance R is far, the deflection δ2 arising due to the shift of the principal point H of the lens L can be negligible, and it will be understood that the nearer the focusing distance R, and the longer the focal length f, the larger the deflection δ2 due to the shift of the principal point H of the lens L is in proportion to the whole deflection δ which, preferably, is not to be neglected.

Consequently, as mentioned above, at far distances where the deflection δ2 arising due to the shift of the principal point H of the lens L can be neglected, external light photography can be performed. Alternatively, at close distances where the deflection δ2 arising due to the shift of the principal point H of the lens L should not be neglected, and by performing strobe photography, this deflection δ2 arising due to the shift of the principal point H of the lens L can be prevented.

The foregoing discussions indicate that with photographic mode selection circuitry to select strobe photography, deflection can be effectively prevented. In the case in which the proportion of the deflection due to a shift of the principal point of the lens is large in relation to the whole deflection, performing strobe photography, will result in having the optical axis of the photographic lens being detected only by angular velocity sensors, and in addition, detection circuitry to detect the shift of the principal point of the lens is not necessary.

Moreover, by means of the deflection preventing device of the camera according to the preferred embodiment of the present invention, the exposure mode selection circuitry, makes use of the brightness level as a standard for whether or not to select strobe photography. In the case where the brightness level is less than or equal to a set brightness level, strobe photography is selected; otherwise in the case where the luminosity is greater than a set brightness level, exterior light photography is selected. Also the closer the distance that the camera is to the photographic subject, the higher the brightness level. Moreover, the longer the focal length the higher the brightness level. Additionally, the larger the photographic magnification the higher the brightness level. Interestingly, the state requiring strobe photography or exterior light photography is selected in accordance with the brightness level. As such, it becomes possible to effectively perform deflection prevention using brightness level as a factor to evaluate.

Figure 2:
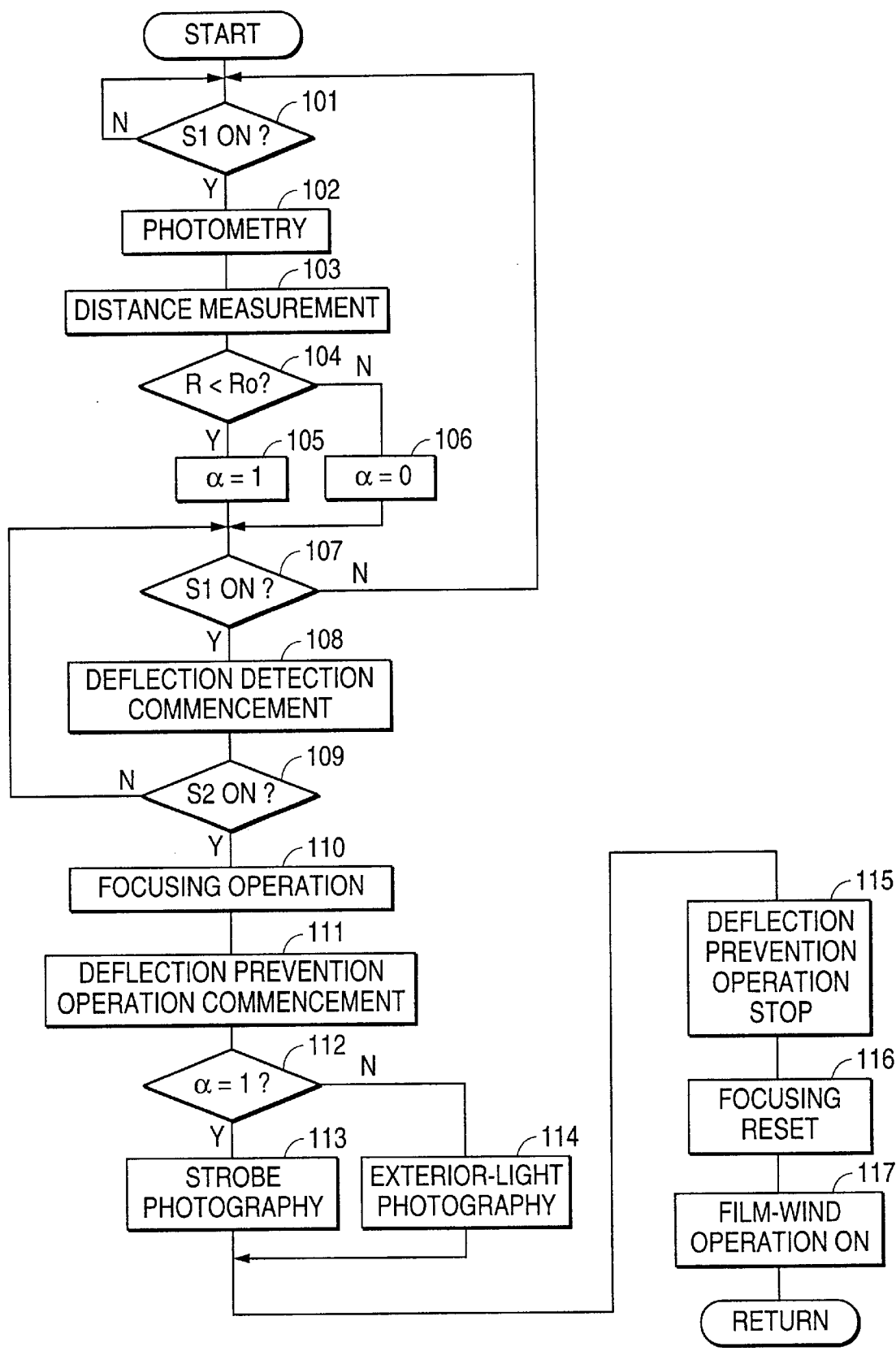
FIG. 2 is a flow chart which indicates an exemplary operation sequence of an image deflection preventing device of a camera device according to a preferred embodiment of the present invention.

The control flow chart related to the above-described operation of the device can be seen in FIG. 2. Referring now to FIG. 2, starting by switching ON the main switch, not shown in the drawing, when the release button (not shown in the drawing) of a camera containing the present invention is half depressed, switch S1 is set ON (step 101), and photometry and distance measurement are performed (steps 102, 103).

Next, in step 104 by means of the photographic mode selection circuit 57, a determination is performed as to whether the focusing distance R is a closer distance than a predetermined distance $R_o$; if it is a closer distance, a flag $\alpha$ is set to 1 (step 105), and if it is not, the flag $\alpha$ is set to 0 (step 106). After this, with switch S1 remaining ON, deflection detection is commenced (steps 107, 108).

Next, when the release button is fully depressed, switch S2 is set ON, and as will be apparent from steps 109, 110 and 111, a photograph is taken. Furthermore, deflection preventing action is commenced at step 108. Then, if the flag $\alpha$ is 1, strobe photography is performed, and if the flag $\alpha$ is 0, exterior light photography is performed (steps 112, 113, 114).

Moreover, when the photographic action ends, by means of step 115, the deflection preventing action is stopped. Furthermore, by steps 116, 117, focusing is reset, the film is wound on, and the program returns to the beginning (i.e., the camera is again ready to take another photograph).

Figure 3:
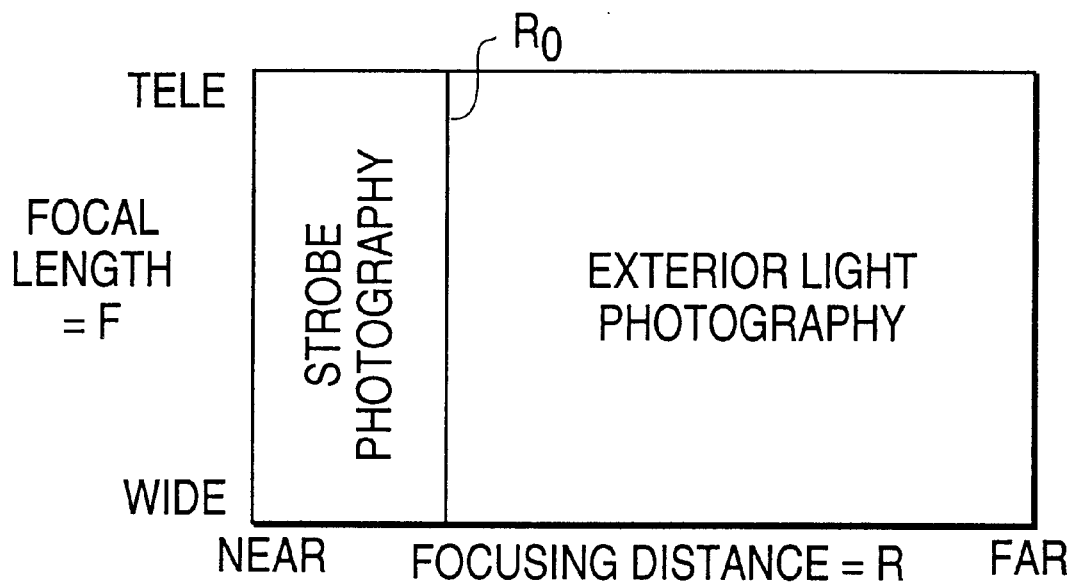
FIG. 3 is a diagram which shows the areas of strobe photography and exterior light photography realized with the exemplary operation sequence depicted in FIG. 2.

FIG. 3 is a diagram showing the areas for strobe photography and exterior light photography for the first operation example according to the flow chart depicted FIG. 2.

Here, in this first operation example, unrelated to the focal length f, if the focusing distance R is a closer distance than the prescribed distance $R_o$, strobe photography is performed; otherwise, exterior light photography is performed. For example, using a zoom lens of focal length f=35–105 mm, predetermined distance $R_o$=1.2 m, when the proportion of the deflection $\delta 2$ due to the shifting of the principal point H of the lens L to the whole deflection $\delta$ is found using equations (3) and (8) hereinabove, it becomes 3.01% at 35 mm, 6.22% at 70 mm, and 9.69% at 105 mm.

Accordingly, in the case in which the focusing distance R is a closer distance than 1.2 m, the proportion of the deflection $\delta 2$ due to the shifting of the principal point H of the lens L to the whole deflection $\delta$ is, in particular, in excess of 10% for a focal length of 105 mm, and therefore cannot be neglected. Consequently, strobe photography is performed.

Moreover, in the case in which the focusing distance R is a greater distance than 1.2 m, the proportion of the deflection $\delta 2$ due to the shifting of the principal point H of the lens L to the whole deflection $\delta$ is less than 10%, and therefore can be neglected. Consequently, according to the photometric result, exterior light photography is performed.

While the above focusing distance (R=1.2 m) has been described, it would be understood that the present invention will function by allowing the distance to be determined within a range of 10–20 times the focal length of a lens (F (mm)). Moreover, the above examples should not limit the scope of the invention.

Figure 4:
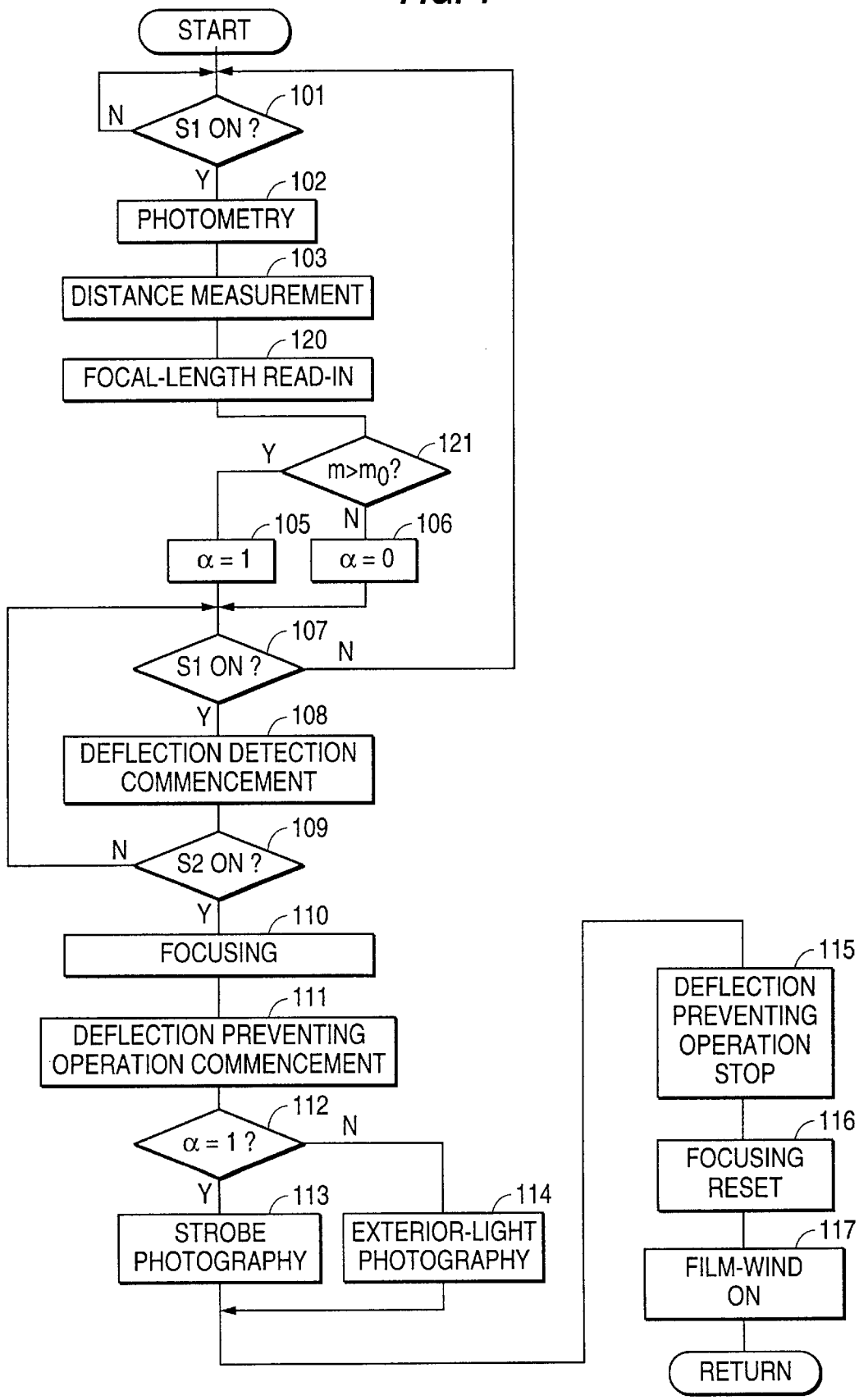
FIG. 4 is a flow chart which indicates another exemplary operation sequence of an image deflection preventing device of a camera device according to a preferred embodiment of the present invention.

FIG. 4 is a flow chart to explain a second operation example in the deflection preventing device of the camera according to a preferred embodiment of the present invention.

The points of difference in this second operation example are that the distance measured by the focal length detection device, which detects the focal length of the photographic lens 2, is read in by the focal length reading circuit 56 in step 103, and reading in of the focal length is performed in step 120. Further, in step 121, by means of the exposure mode selection circuit 57, a determination is performed of whether or not the photographic magnification m is larger than a predetermined photographic magnification $m_o$; if it is larger, the flag a is set to 1, and if not, the flag $\alpha$ is set to 0 (steps 105, 106). Apart from these differences, the control operation depicted in the flow chart of FIG. 4 is the same as the aforementioned flow chart of FIG. 2, and a redundant description is not provided.

Figure 5:
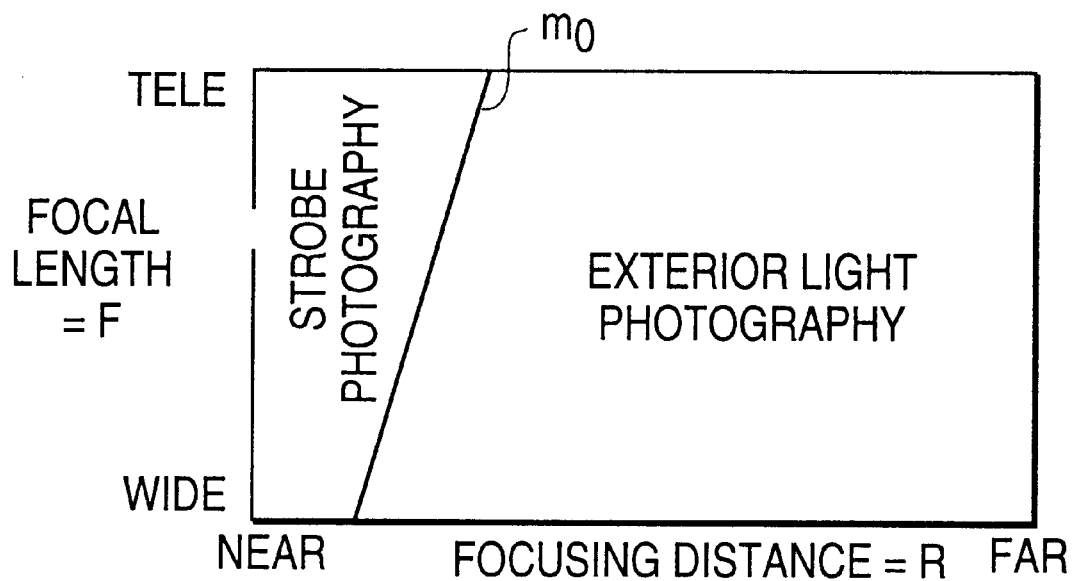
FIG. 5 is a diagram which shows the areas of strobe photography and exterior light photography realized with the exemplary operation sequence depicted in FIG. 4.

FIG. 5 shows the areas for strobe photography and exterior light photography for the second operation example according to the operation flow depicted in FIG. 4. Referring now to FIG. 4, if the photographic magnification m is larger than the predetermined magnification $m_o$, strobe photography is performed; otherwise, exterior light photography is performed. For example, using a zoom lens of focal length 35–105 mm, and the predetermined magnification uniformly as 1/10 for each focal length, similarly when, using equations (3) and (8), the proportion of the deflection $\delta 2$ due to the shifting of the principal point H of the lens L to the whole deflection $\delta$ is found, and it becomes 9.09% for each focal length. The remainder of this FIG., which is similar to that shown in FIG. 3, need not be further described here.

The above-described examples illustrated a magnification $M_o$=1/10; but it should be understood that the magnification $M_o$ may be determined to be within a range, for example, of between 1/20–1/10.

Figure 6:
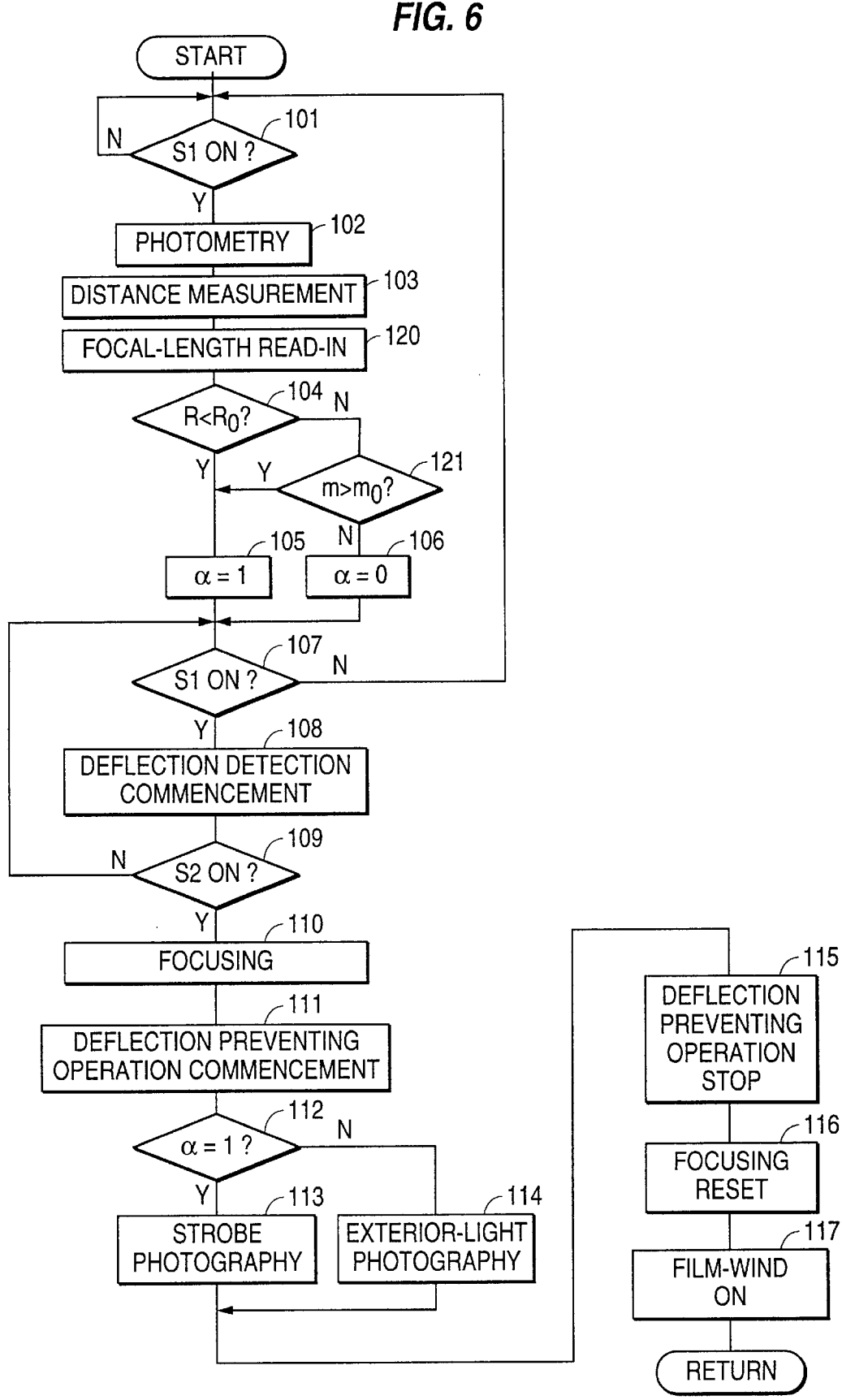
FIG. 6 is a flow chart which indicates a third exemplary operation sequence of an image deflection preventing device of a camera device according to the present invention.

FIG. 6 is a flow chart showing a third operation example of a case in which deflection preventing is performed using the deflection preventing device of a camera according to a preferred embodiment of the present invention. However, this operation example is a combination of the aforementioned first and second operation examples as will be apparent from steps 104 and 121. When the photographic magnification is larger than the prescribed photographic enlargement $m_o$ as determined by the exposure mode selection circuit 57, and also when the photographic distance R is a closer distance than a predetermined distance $R_o$, the flag $\alpha$ is set to 1, and if not, the flag $\alpha$ is set to 0 (steps 105, 106). Apart from this, as the rest of the control in the flow chart of FIG. 6 is similar to that for FIGS. 2 and 4 hereinabove, a redundant, similar description will be omitted.

Figure 7:
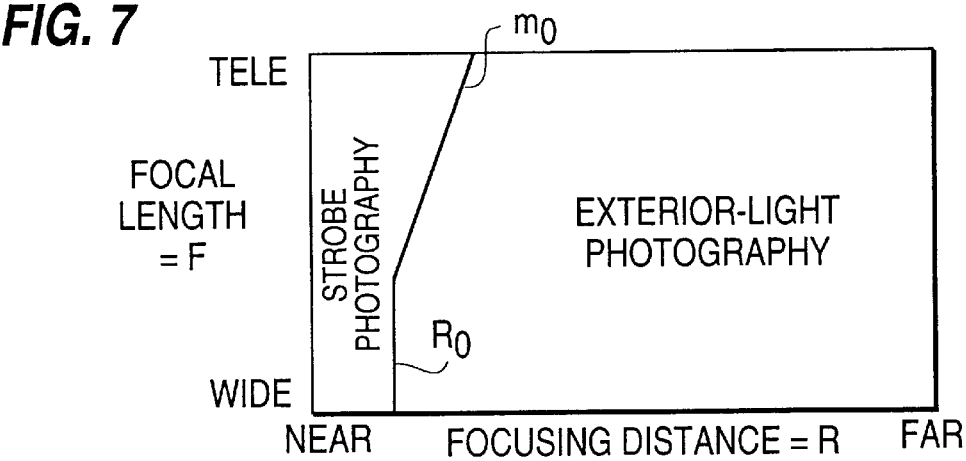
FIG. 7 is a diagram which shows the areas of strobe photography and exterior light photography realized with the exemplary operation sequence depicted in FIG. 6.

FIG. 7 is a diagram showing the areas for strobe photography and exterior light photography for the third operation example according to FIG. 6. Here, if the photographic magnification m is larger than the predetermined magnification $m_o$, and if the focusing distance R is a closer distance than the predetermined distance $R_o$, strobe photography is performed; otherwise, exterior light photography is performed. Such a case is shown in this third operation example, in which in the limiting case when the focusing distance R is on the tele-photo side the prescribed photographic magnification $m_o$ is 1/10, and on the wide-photo side the prescribed distance $R_o$ is 0.65 m.

Moreover, as the rest of FIG. 7 is similar to that for FIGS. 3 and 5 above, a redundant, similar description will be omitted.

The case on the tele side above the magnification $m_o=1/10$, and on the wide angle side of a focusing distance $R_o=0.65$ m has been described, but on the tele side the magnification $m_o$ may be made to be in the range of 1/20–1/10. Additionally, the wide angle side of the distance $R_o$ may be made a distance determined to be within a range of 10–20 times the focal length f (mm) of the lens.

In each of the operation examples described above, strobe photography is satisfactory in either of the following circumstances:

(1) the shutter speed is set as 1 second divided by the focal length; that is, regardless if the deflection correction operation is performed;

(2) the shutter speed is set according to the photometric result, and the deflection correction operation is performed.

Moreover, the state of deflection in the camera varies according to the configuration of the camera, its size and weight, the position of the center of gravity, the focal length f of the photographic lens 2, and the like. Accordingly, camera 1 is not limited by the above-mentioned operation examples, and an effective demarcation can be made between strobe photography and exterior light photography.

Figure 9:
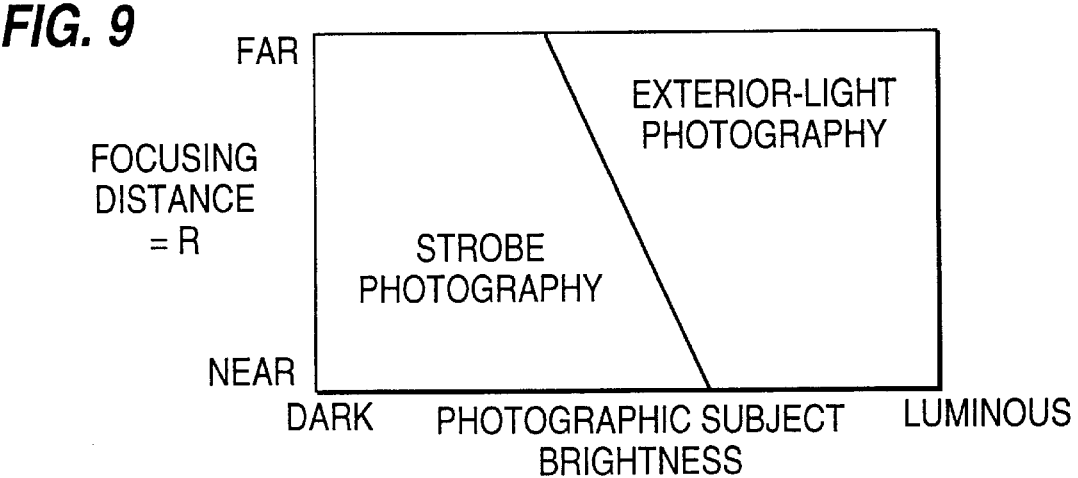
FIG. 9 is a diagram which shows the areas of strobe photography and exterior light photography realized with the exemplary operation sequence depicted in FIG. 8.
Figure 8:
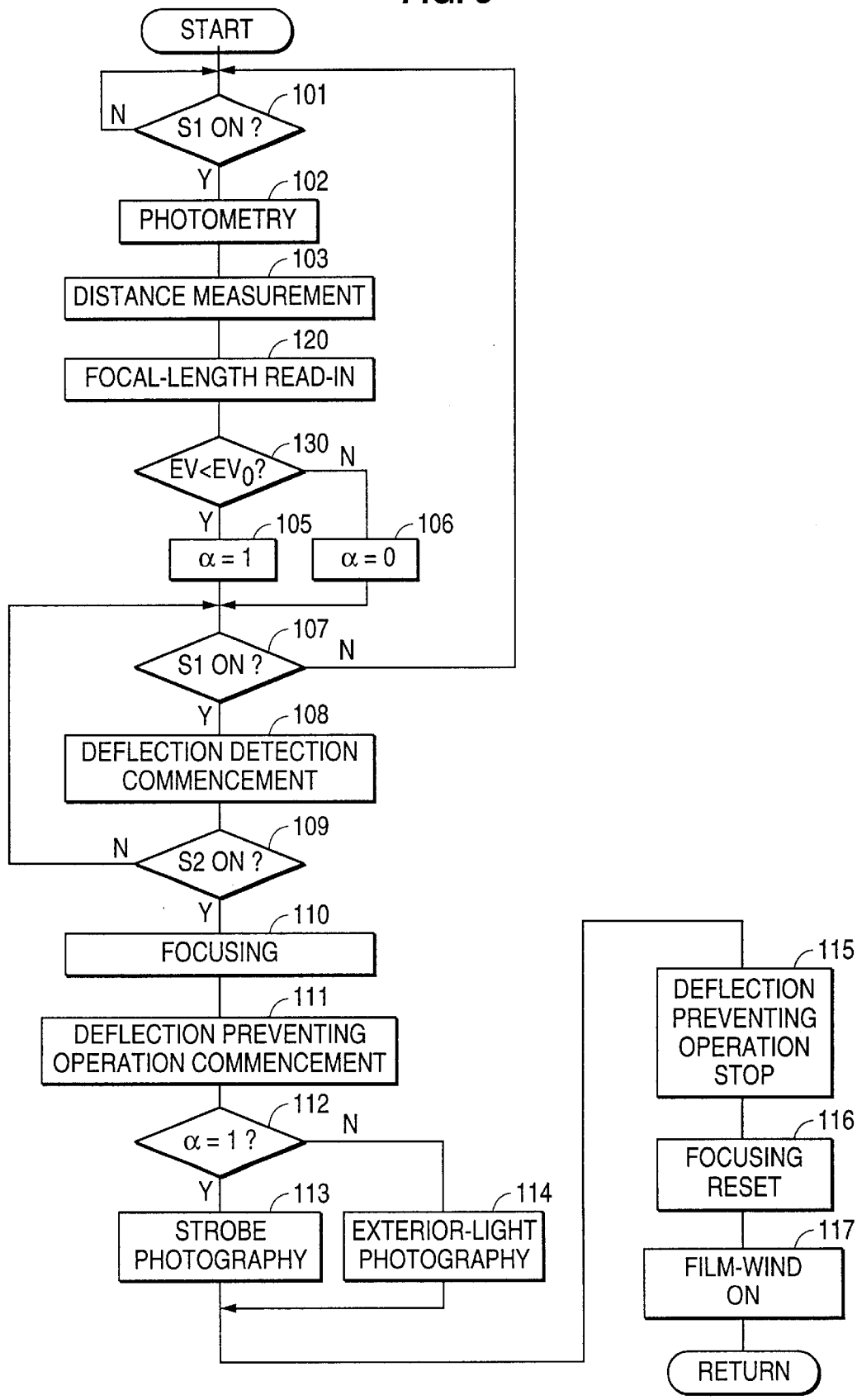
FIG. 8 is a flow chart which indicates an exemplary operation sequence of an image deflection preventing device of a camera device according to another preferred embodiment of the present invention.

FIGS. 8 and 9 show another embodiment example of the deflection preventing device of a camera according to the present invention. Since the majority of the deflection preventing device is equivalent to that of FIG. 1 and FIGS. 11–17, specific illustration and description will be omitted.

In this embodiment, as will be apparent from the flow chart shown in FIG. 8, the exposure mode selection circuit 57 is arranged such that the brightness level is used as a standard as to whether or not strobe photography is used. Moreover, in situations where luminosity is greater than a particular brightness level, exterior light photography will be selected. Additionally, the closer the distance, the higher the brightness level is set.

In this embodiment, exposure mode selection circuit 57 assesses the brightness of the photographic subject at each focusing distance. As such, exposure mode selection circuit 57 assesses at step 130 whether or not the exposure value Ev is smaller than a prescribed exposure value EvO; when it is assessed to be smaller, in step 105 the flag α is set to 1, and if not, the flag α is set to 0 in step 106. The rest of the operation which is shown in FIG. 8 is substantially similar to that shown in FIGS. 2, 4 and 6, and, therefore, its detailed description is omitted.

FIG. 9 is a diagram showing the areas for strobe photography and exterior light photography realized in the operating example shown in the above-mentioned flow chart of FIG. 8. In the case in which the proportion of the deflection δ2 due to the shifting of the principal point H of the lens L to the whole deflection δ becomes large and cannot be neglected, strobe photography is selected. However, according to the photometric result, for a high brightness photographic subject for which the shutter speed becomes a higher speed than 1 second divided by the focal length, it is difficult for deflection to arise and therefore strobe photography is not necessary. Moreover, the greater the focusing distance, the smaller the proportion becomes of the deflection δ2 due to the shifting of the principal point H of the lens L to the whole deflection δ.

Accordingly, as shown by FIG. 9, as the focusing distance becomes a close distance, the high brightness side region of strobe photography may become wider.

As such, the exposure EvO and the shutter speed are determined from the photometric result of the photometric device. Moreover, the luminosity as determined by the photosensitive device is set according to the shutter speed determined to be in the range from a shutter speed including of a value of the reciprocal of the focal length (mn) of a photographic lens to 3×Tv depending on how slow the shutter speed is. This arrangement provides that the longer the focal length of the photographic lens, the higher the luminosity to which the exposure value Evo may be set.

Figure 10:
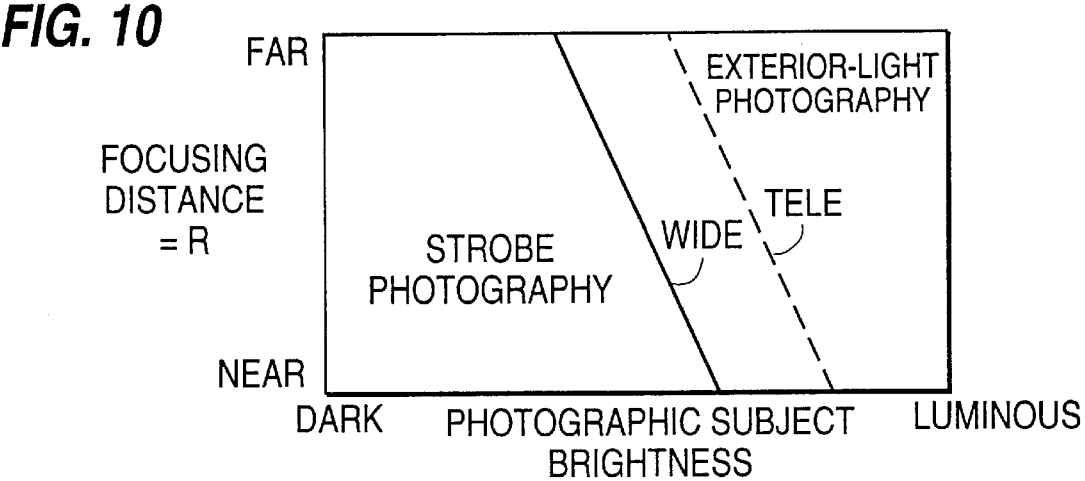
FIG. 10 is a diagram which shows the areas of strobe photography and exterior light photography according to a modification of the exemplary operation sequence depicted in FIG. 9.

FIG. 10 is a diagram showing the areas for strobe photography and exterior light photography for a second operation example for the embodiment shown in FIG. 8. As the focusing distance R is a closer distance, and also the longer the focal length, the larger the proportion becomes of the deflection δ2 arising due to the shifting of the principal point H of the lens L to the whole deflection δ. Accordingly, as shown in FIG. 10, as the focusing distance becomes a close distance, and as the focal length (wide - tele) becomes long, the high brightness side in the region of strobe photography may become wider. Additionally, it should be understood that the larger the photographic magnification, the higher the brightness level that may be set.

Moreover, in the afore-mentioned embodiment example, a description has been given of a case in which the present invention has been applied to a camera possessing a focal plane shutter 12, but it is not limited to this. In a well known prior art camera, in order to prevent image deflection due to hand tremor and the like, because the deflection preventing lens is caused to shift in a direction at right angles to the optical axis I, it goes without saying that no limitations are imposed by the structural aspects of the camera. The exposure value of Evo and the shutter speed are determined from the photometric result and the exposure value Evo may be set based on shutter speed determined within the range from the shutter speed including the value of the reciprocal of the focal length (mm) of the photographic lens 3×Tv depending on the slowness of shutter speed. Additionally, the magnification Mo may be determined within the range of 1/20–1/10 times the focal length of the photographic lens.

Figure 21:
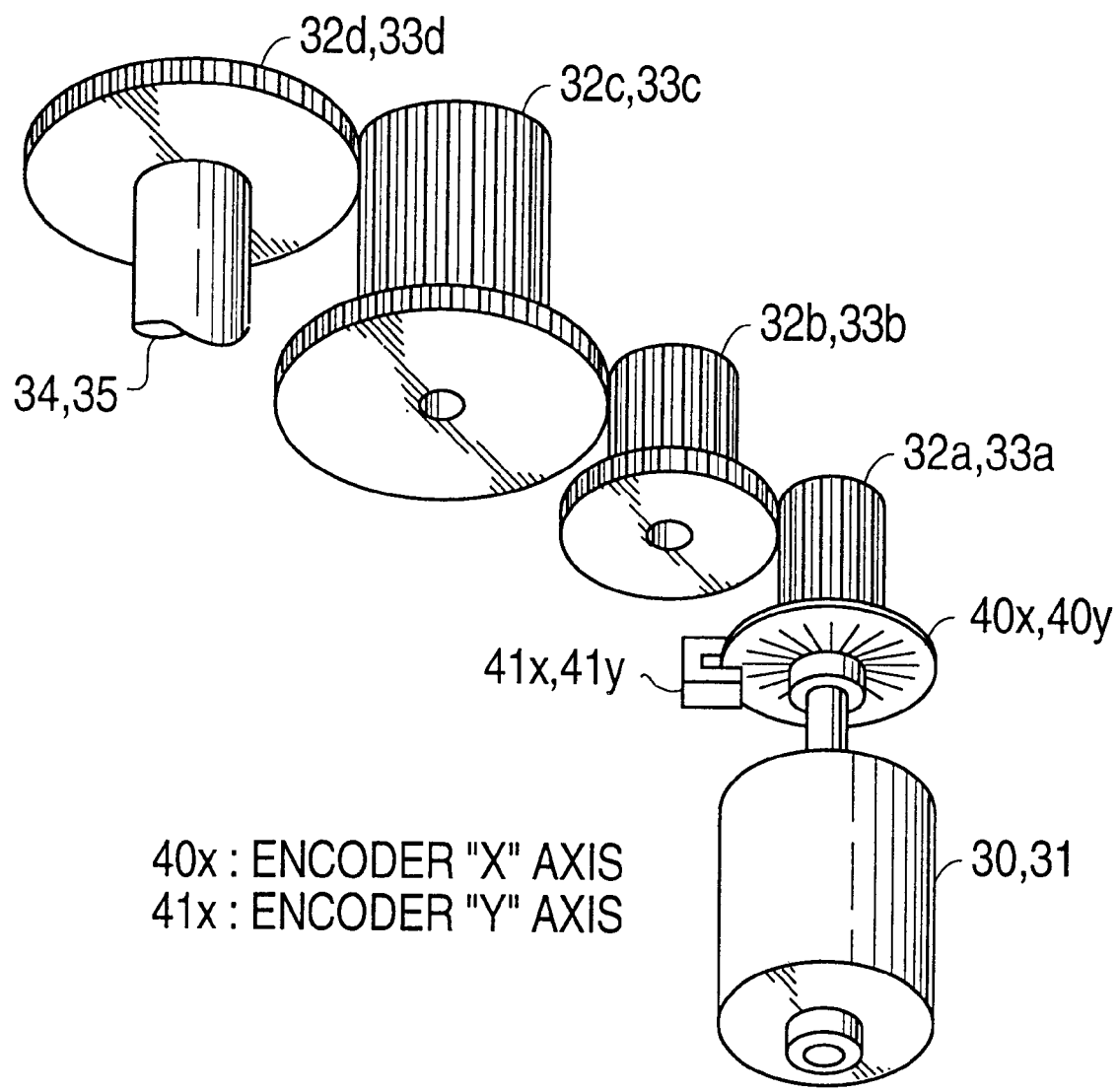
FIG. 21 is a view of a motor and gear assembly of yet another embodiment of the present invention.

Referring now to FIG. 21, therein depicted is a view of a motor and gear assembly of yet another embodiment of the present invention. More particularly, the detection of the position and speed of the above-described image deflection preventing lens 8, is performed by means of detecting the rotation angle of the respective X axis and, Y axis side motors 30 and 31, by way of photointerruptors 41x and 41y set up on the baseplate 21 (not shown) side in a state with perforated disks 40x and 40y. Each perforated disk 40x and 40y has plural holes formed at equal spacings on the irrespective rim portions, inserted between their rim portions, and also arranged integrally with gears 32a, 33a, Namely, by means of the photointerruptors 41x and 41y, the number of holes of the disks 41x and 41y is detected as pulse signals, and the detection of the position and speed is performed by counting such pulses.

Figure 22:
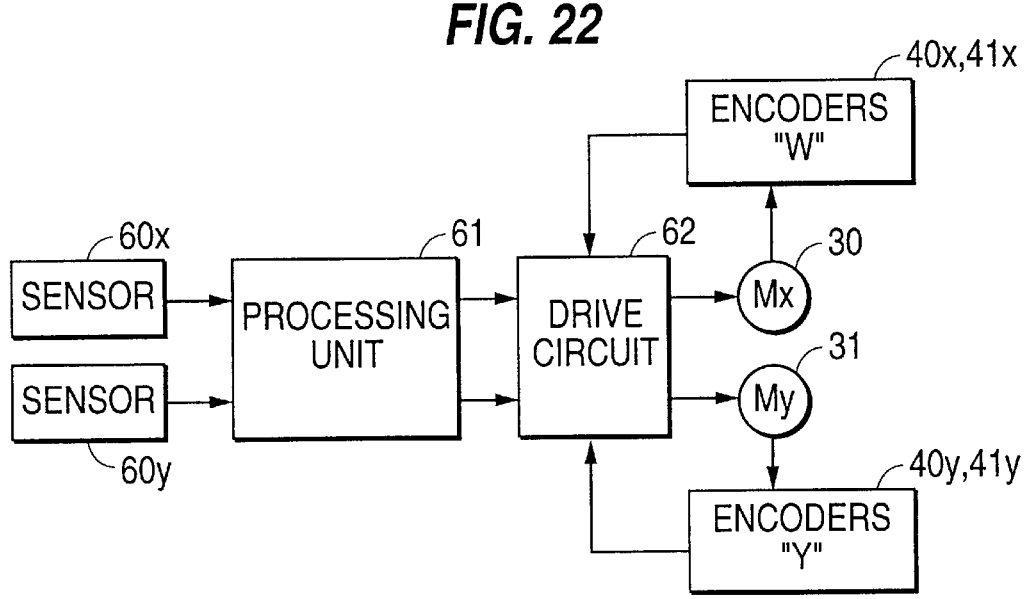
FIG. 22 is a block diagram of yet another embodiment of the present invention.
Figure 23:
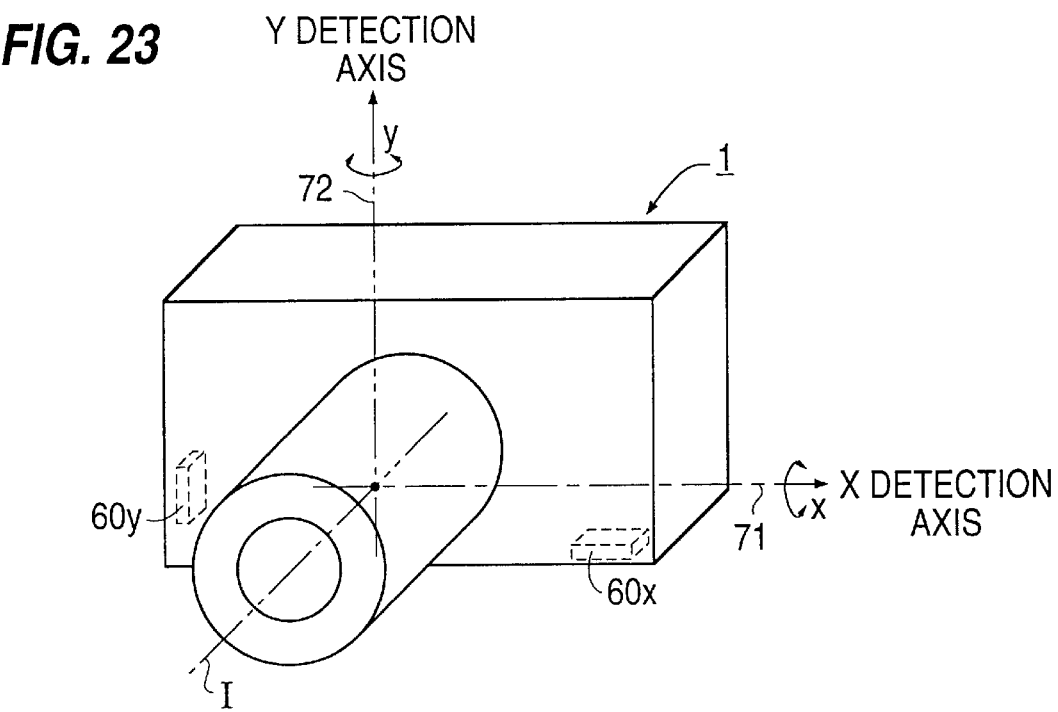
FIG. 23 is a schematic diagram of a camera in which motion sensors are incorporated according to yet another embodiment of the present invention.

The operation of the above-mentioned image deflection preventing device of FIG. 21 will next be described with reference to FIG. 22. FIG. 22 shows a block diagram of the circuit to control an image deflection preventing device according to the present invention. In FIG. 22, when the angular velocity (deflection) generated in the camera is detected by means of sensors 60x and 60y (see e.g., FIG. 23), the information concerning the angular velocity is transmitted to a processing circuit 61. The processing circuit 61 calculates from the aforementioned sensations of sensors 60x and 60y the movement velocity of the image on the imaging plate 16. Accordingly, such velocity information is transmitted to the drive circuit 62.

The drive circuit 62, in accordance with the above-described velocity information and the respective image velocities to be negated in the X and Y directions, controls motors 30 and 31 so as to cause motors 30 and 31 to rotate in order to drive the image deflection preventing lens 8. Moreover, this time, the rotation angles and rotary velocities of the motors 30 and 31 are detected by means of the X axis side encoder (by means of the disk 40x and photointerruptor 41x) and the Y axis side encoder (by means of the disk 40y and photointerruptor 41y), and are fed back to the drive circuit 62. Accordingly, drive control is performed.

By way of the above-described control operations, the image deflection prevention lens 8 is driven in a predetermined direction, and by a predetermined amount in a direction perpendicular to the optical axis direction (axis "I" of FIG. 23), so that image deflection is prevented.

A description has been given above of an embodiment example of a deflection preventing device according to the invention, but the present invention is not limited to the above-mentioned embodiment example, and various modifications are possible without departing from the spirit of the present invention. For example, in the embodiment just described, the motors 30 and 31 in FIG. 21 are respectively positioned at the left-hand side and lower side of the moving frame 6 (not shown), but are not to be so limited. According to the structure of the image deflection preventing mechanism unit 20, (see FIG. 13) the motors may be positioned at the right-hand side and the upper side of a lens housing. Moreover, the motors were positioned so that the rotary shafts of the motors 30 and 31 and the direction of motion of the image deflection lens 8 were in approximately the same direction, but bevel gears and the like having intersecting axis gears may be used for each of gears 32 and 33, and at the same time, the rotary shafts of the motors 30 and 31 and the movement direction of the image deflection prevention lens 8 may not operate in approximately the same direction.

By way of the deflection preventing device according to the embodiments just described, the distance of the drive unit and the deflection prevention lens group can actually be made quite short. Moreover, when the deflection preventing lens group is caused to move in the direction of the optical axis, the moving unit and the deflection preventing lens can be made to move. Additionally, because there is no possibility for slide movement in the optical axis direction, backlash of gears can be set to a small value.

By way of the deflection prevention device of the embodiment just described, a compact assembly of the drive unit becomes possible, and accordingly, the lens barrel diameter also can be made small. Moreover, when the deflection preventing lens group moves in the optical axis direction, the movement space of the deflection prevention lens group is not limited by the drive unit. Additionally, the amount of the movement of the deflection preventing lens is kept small, and accordingly, the change of magnification during zooming type operations can be large.

The present invention is not limited to the structure of the above-mentioned embodiments, and it goes without saying that many modifications and changes may be made to the form, structure and operation, including the image deflection preventing unit 20 which provides the image deflection preventing device of the camera shown in the figures and described herein, without departing from the spirit or scope of the invention. Furthermore, it goes without saying that the deflection preventing device of the camera according to the present invention is not limited to a camera such as that mentioned above, and its effects may be manifested when applied to all kinds of optical instruments, devices and the like (e.g. video cameras, digital cameras, etc.).

What is claimed is:

1. An image deflection preventing device for use with a camera, the camera being equipped with a lens and an imaging surface, the image deflection preventing device comprising:

an image deflection unit, having a deflection preventing optical system, to determine image deflection information based upon motion of the camera and prevent deflection of an image of a photographic subject on the imaging surface in accordance with the image deflection information;

a distance measuring unit to measure the distance from the camera to the photographic subject;

an exposure mode selection unit to select strobe mode photography in accordance with the distance measured by said distance measuring unit and independent of the image deflection information; and a focal length detection unit to detect the focal length of said lens, wherein said exposure mode selection unit selects strobe mode photography in the case when a photographic magnification is greater than a predetermined value.

2. An image deflection preventing device for use with a camera, the camera being equipped with a lens and an imaging surface, the image deflection preventing device comprising:

an image deflection unit, having a deflection preventing optical system, to determine image deflection information based upon motion of the camera and prevent deflection of an image of a photographic subject on the imaging surface in accordance with the image deflection information;

a distance measuring unit to measure the distance from the camera to the photographic subject;

an exposure mode selection unit to select strobe mode photography in accordance with the distance measured by said distance measuring unit and independent of the image deflection information; and a focal length detection unit to detect the focal length of said lens, wherein said exposure mode selection unit selects strobe mode photography when an in-focus distance according to the focal length is a closer distance than a predetermined distance.

3. An image deflection preventing device for use with a camera, the camera being equipped with a lens and an imaging surface, the image deflection preventing device comprising:

an image deflection unit, having a deflection preventing optical system, to determine image deflection information based upon motion of the camera and prevent deflection of an image of a photographic subject on the imaging surface in accordance with the image deflection information;

a distance measuring unit to measure the distance from the camera to the photographic subject;

an exposure mode selection unit to select strobe mode photography in accordance with the distance measured by said distance measuring unit and independent of the image deflection information; and a focal length detection unit to detect the focal length of said lens, wherein said exposure mode selection unit selects strobe mode photography when the distance measured by said distance measuring unit to the photographic subject is within a range of 10–20 times the focal length of the lens.

4. An image deflection preventing device for use with a camera, the camera being equipped with a lens and an imaging surface, the image deflection preventing device comprising:

an image deflection unit, having a deflection preventing optical system, to determine image deflection information based upon motion of the camera and prevent deflection of an image of a photographic subject on the imaging surface in accordance with the image deflection information;

a distance measuring unit to measure the distance from the camera to the photographic subject;

an exposure mode selection unit to select strobe mode photography in accordance with the distance measured by said distance measuring unit and independent of the image deflection information; and a focal length detection unit to detect the focal length of said lens, wherein said exposure mode selection unit selects strobe mode photography when the distance measured by said distance measuring unit to the photographic subject is closer than a distance which is within the range of 10–20 times the focal length of the lens.

5. An image deflection preventing device for use with a camera, the camera being equipped with a lens and an imaging surface, the image deflection preventing device comprising:

an image deflection unit, having a deflection preventing optical system, to determine image deflection information based upon motion of the camera and prevent deflection of an image of a photographic subject on the imaging surface in accordance with the image deflection information;

a distance measuring unit to measure the distance from the camera to the photographic subject;

an exposure mode selection unit to select strobe mode photography in accordance with the distance measured by said distance measuring unit and independent of the image deflection information; and a focal length detection unit to detect the focal length of said lens, wherein said exposure mode selection unit selects strobe mode photography when photographic magnification of said lens is greater than the photographic magnification decided by said focal length detection unit to be within a range of $1/20$–$1/10$ times the reciprocal of the focal length of said lens.

6. An image deflection preventing device for use with a camera, the camera being equipped with a lens and an imagine surface, the image deflection preventing device comprising:

an image deflection unit, having a deflection preventing optical system, to determine image deflection information based upon motion of the camera and prevent deflection of an image of a photographic subject on the imaging surface in accordance with the image deflection information;

a distance measuring unit to measure the distance from the camera to the photographic subject;

an exposure mode selection unit to select strobe mode photography in accordance with the distance measured by said distance measuring unit and independent of the image deflection information; and a focal length detection unit to detect the focal length of said lens, herein said exposure mode selection unit selects strobe mode photography when the distance to the subject is a closer distance than a predetermined distance or the photographic magnification is greater than a predetermined value.

7. An image deflection preventing device for use with a camera, the camera being equipped with a lens and an imaging surface, the image deflection preventing device comprising:

an image deflection unit, having a deflection preventing optical system, to determine image deflection information based upon motion of the camera and prevent deflection of an image of a photographic subject on the imaging surface in accordance with the image deflection information;

a distance measuring unit to measure the distance from the camera to the photographic subject; and an exposure mode selection unit to select strobe mode photography in accordance with the distance measured by said distance measuring unit and independent of the image deflection information, wherein the strobe photography is selected independent of brightness of the photographic subject.

8. An image deflecting preventing device for an optical apparatus having a lens and an imaging surface, the image deflecting preventing device comprising:

an image deflection unit, having a deflection preventing optical system, to determine image deflection information based upon motion of the optical apparatus, and prevent deflection of an image of a photographic subject on the imaging surface in accordance with the image deflection information;

a strobe unit to perform strobe photography;

a distance measuring unit to measure a distance from the camera to the photographic subject; and an exposure mode selection unit to select the strobe photography in accordance with the distance measured by said distance measuring unit and independent of the image deflection information and brightness of the photographic subject.

9. The image deflecting preventing device as claimed in claim 8, further comprising:

a focal length adjustment unit for adjusting a focal length of the lens; and a focal length detection device to measure the focal length of the lens;

wherein said exposure mode selection unit selects the strobe photography based upon a combination of the distance from the camera to the photographic subject and the focal length of the lens.

10. The image deflecting preventing device as claimed in claim 9, wherein said exposure mode selection unit selects the strobe photography based upon the distance from the camera to the photographic subject independent of the focal length while the focal length is less than a predetermined value, and selects the strobe photography based upon a combination of the distance from the camera to the photographic subject and the focal length of the lens while the focal length is at least as great as the predetermined value.

11. An image deflecting preventing device for an optical apparatus having a lens and an imaging surface, the image deflecting preventing device comprising:

an image deflection unit, having a deflection preventing optical system, to determine image deflection information based upon motion of the optical apparatus, and prevent deflection of an image of a photographic subject on the imaging surface in accordance with the image deflection information;

a strobe unit to perform strobe photography;

a focal length adjustment unit for adjusting a focal length of the lens;

a focal length detection device to measure the focal length of the lens; and an exposure mode selection unit to select the strobe photography in accordance with the measured focal length and independent of the image deflection information and brightness of the photographic subject.

* * * * *

UNITED STATES PATENT AND TRADEMARK OFFICE
CERTIFICATE OF CORRECTION

PATENT NO.: 5,999,747
DATED: December 7, 1999
INVENTOR(S): Yoshio Imura et al.

It is certified that error appears in the above-identified patent and that said Letters Patent is hereby corrected as shown below:

Column 18, line 14, change "herein" to --wherein--.

Signed and Sealed this

Twelfth Day of September, 2000

Attest:

Q. TODD DICKINSON

*Attesting Officer*    *Director of Patents and Trademarks*